US008253848B2

(12) United States Patent
Terashima

(10) Patent No.: US 8,253,848 B2
(45) Date of Patent: *Aug. 28, 2012

(54) IMAGING APPARATUS, IMAGING APPARATUS CONTROL METHOD, AND COMPUTER PROGRAM PRODUCT, WITH EYE BLINK DETECTION FEATURES

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 12/757,606

(22) Filed: Apr. 9, 2010

(65) Prior Publication Data

US 2010/0194912 A1    Aug. 5, 2010

Related U.S. Application Data

(63) Continuation of application No. 11/756,067, filed on May 31, 2007, now Pat. No. 7,714,927.

(30) Foreign Application Priority Data

Jun. 9, 2006    (JP) .................................. 2006-160454

(51) Int. Cl.
G03B 13/00    (2006.01)
(52) U.S. Cl. .......................... 348/353; 348/345; 348/349
(58) Field of Classification Search .................. 348/335, 348/345–357

See application file for complete search history.

(56) References Cited

U.S. PATENT DOCUMENTS

| 5,878,156 | A | 3/1999 | Okumura |
| 6,721,499 | B2 * | 4/2004 | Watanabe et al. ............. 396/127 |
| 6,829,432 | B2 | 12/2004 | Misumi et al. |
| 6,996,340 | B2 | 2/2006 | Yamaguchi et al. |
| 7,298,412 | B2 * | 11/2007 | Sannoh et al. ................ 348/348 |
| 7,362,368 | B2 | 4/2008 | Steinberg et al. |
| 7,391,463 | B2 | 6/2008 | Nonaka |
| 7,450,171 | B2 | 11/2008 | Ide et al. |
| 7,714,927 | B2 * | 5/2010 | Terashima ..................... 348/345 |
| 2002/0180784 | A1 | 12/2002 | Shiratani |
| 2004/0207743 | A1* | 10/2004 | Nozaki et al. ............ 348/333.12 |
| 2006/0147192 | A1 | 7/2006 | Zhang et al. |
| 2006/0171699 | A1* | 8/2006 | Nakai et al. ................... 396/125 |
| 2007/0025722 | A1 | 2/2007 | Matsugu et al. |
| 2007/0047941 | A1 | 3/2007 | Iwane et al. |

FOREIGN PATENT DOCUMENTS

| JP | 10-213737 | 8/1998 |
| JP | 2003-107335 | 4/2003 |
| JP | 2004-133637 | 4/2004 |
| JP | 2005-128156 | 5/2005 |

* cited by examiner

*Primary Examiner* — Sinh Tran
*Assistant Examiner* — Mark Monk
(74) *Attorney, Agent, or Firm* — Oblon, Spivak, McClelland, Maier & Neustadt, L.L.P.

(57) ABSTRACT

An imaging apparatus includes a focus control unit that sets an image area including eyes, which is included in an input image inputted in the imaging apparatus, as a range finding area for calculation of a subject distance and acquires an evaluation value based on contrast of the range finding area to detect a focus position and a blink detecting unit that detects presence or absence of a blink on the basis of image analysis in the range finding area. The focus control unit inputs blink detection information in the blink detection unit, identifies evaluation value data in a blink period and a non-blink period, and executes processing for detecting a focus position on the basis of only an evaluation value in a period judged as the non-blink period.

13 Claims, 16 Drawing Sheets

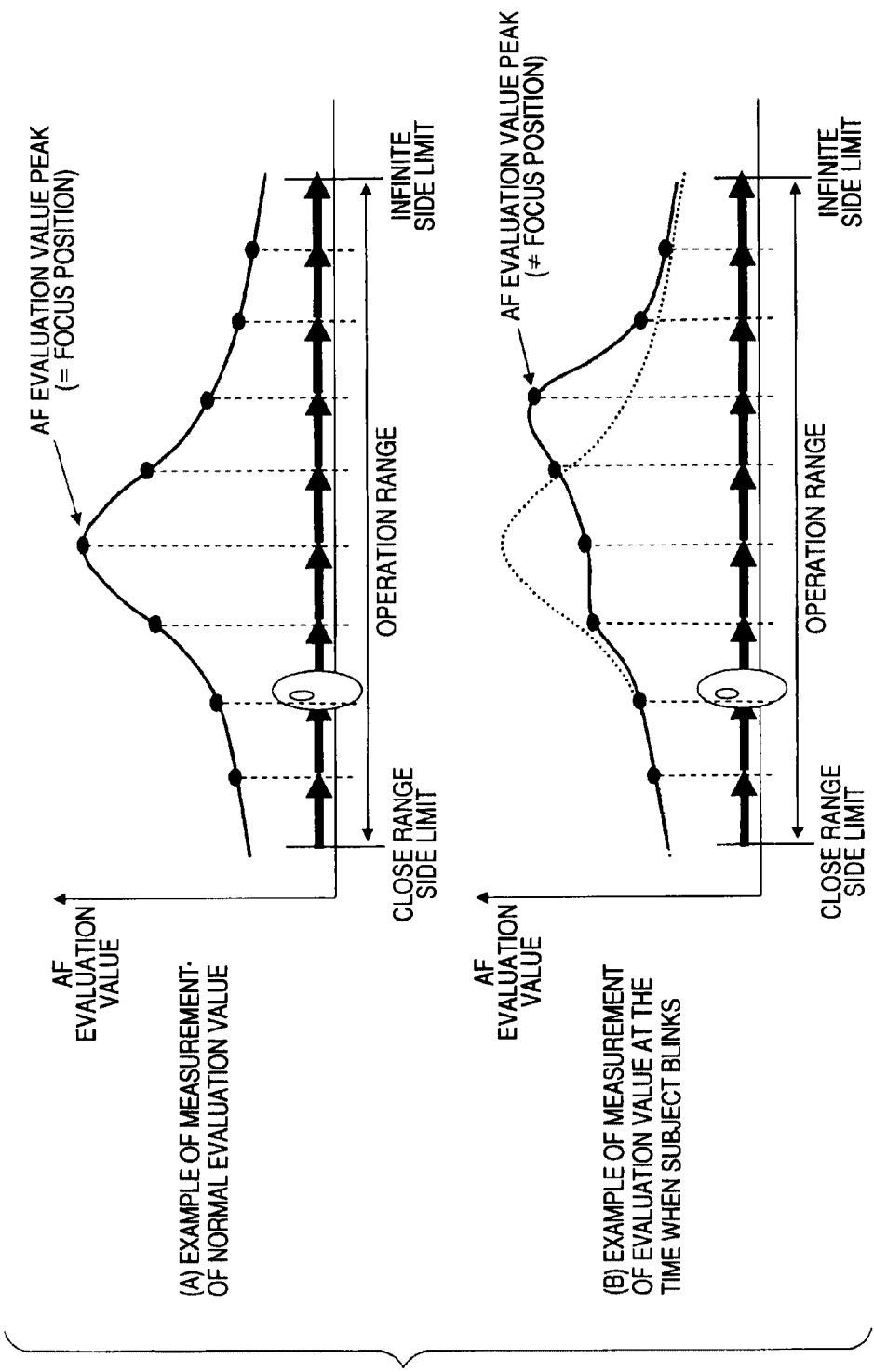

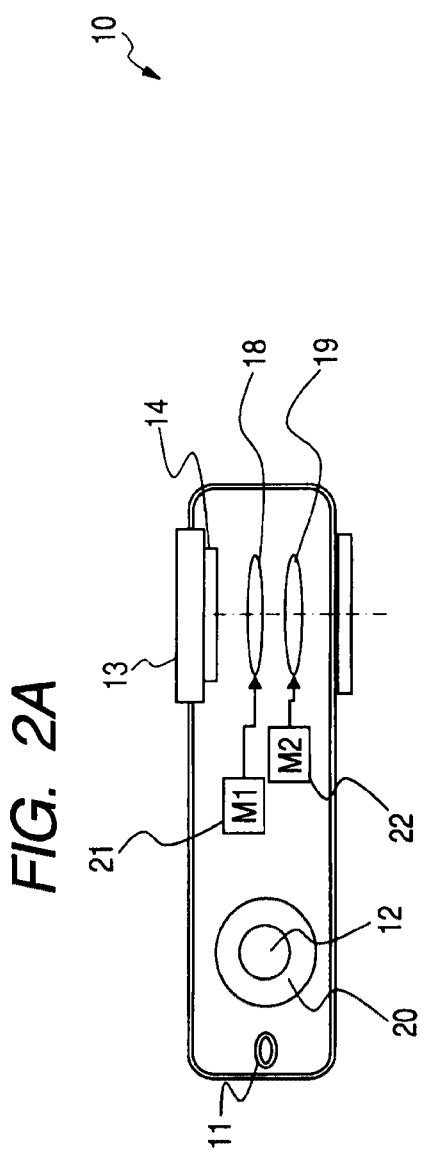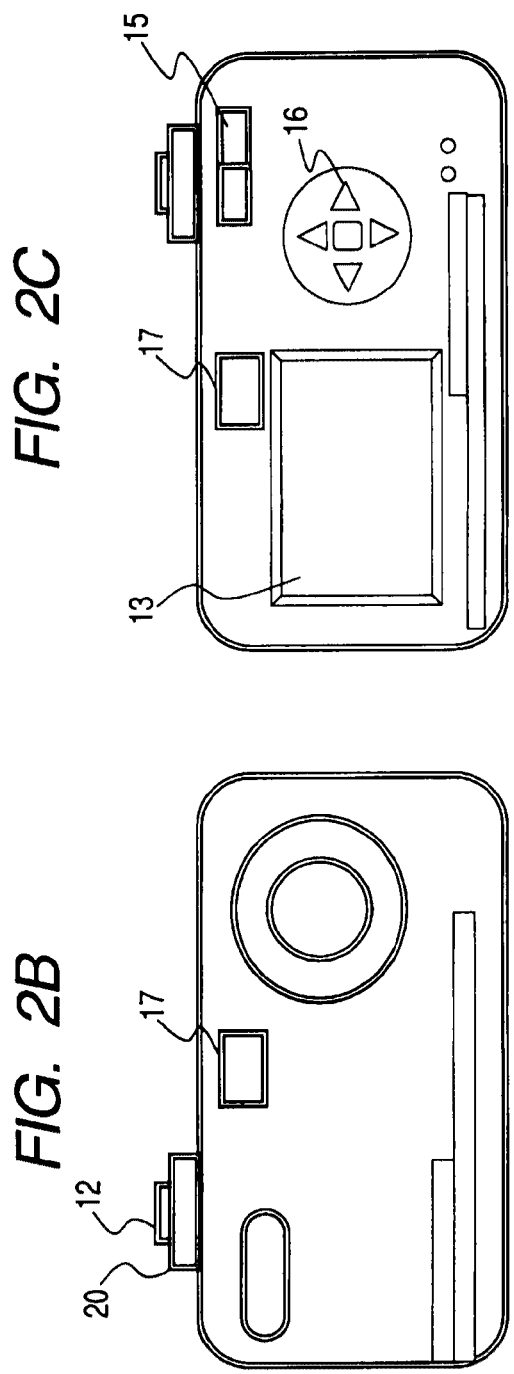

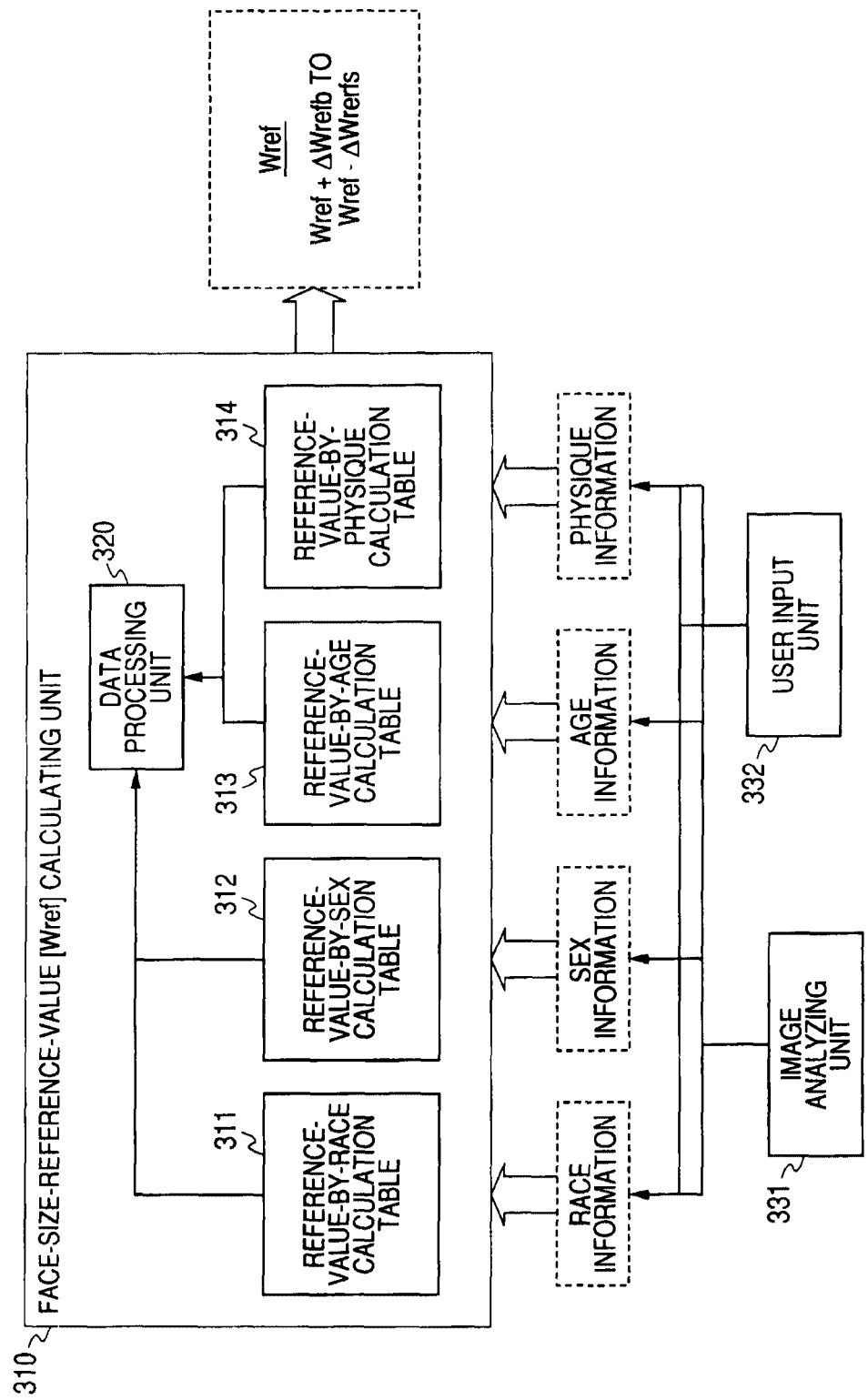

FIG. 9

(A) REFERENCE-VALUE-BY-RACE CALCULATION TABLE

|  | WIDTH | | LENGTH | |
|---|---|---|---|---|
|  | MINIMUM | MAXIMUM | MINIMUM | MAXIMUM |
| COMMON | 8 | 20 | 8 | 28 |
| ASIANS | 8 | 18 | 9 | 26 |
| EUROPEANS AND AMERICANS | 8 | 20 | 9 | 28 |
| AFRICANS | 8 | 17 | 8 | 25 |

(B) REFERENCE-VALUE BY RACE AND SEX CALCULATION TABLE

|  | SEX | WIDTH | | LENGTH | |
|---|---|---|---|---|---|
|  |  | MINIMUM | MAXIMUM | MINIMUM | MAXIMUM |
| COMMON | COMMON | 8 | 20 | 8 | 28 |
|  | MALE | 8 | 20 | 9 | 28 |
|  | FEMALE | 8 | 17 | 8 | 26 | ← B ROW
| ASIANS | COMMON | 8 | 18 | 9 | 26 |
|  | MALE | 8 | 18 | 9 | 26 | ← A ROW
|  | FEMALE | 8 | 16 | 9 | 24 |
| EUROPEANS AND AMERICANS | COMMON | 8 | 20 | 9 | 28 |
|  | MALE | 8 | 20 | 9 | 28 |
|  | FEMALE | 8 | 17 | 9 | 26 |
| AFRICANS | COMMON | 8 | 20 | 9 | 28 |
|  | MALE | 8 | 20 | 9 | 28 |
|  | FEMALE | 8 | 17 | 8 | 26 |

FIG. 10

(C) REFERENCE-VALUE BY RACE, SEX, AND AGE CALCULATION TABLE

| | AGE | | WIDTH | | LENGTH | |
|---|---|---|---|---|---|---|
| | | | MINIMUM | MAXIMUM | MINIMUM | MAXIMUM |
| ASIANS | COMMON | COMMON | 8 | 18 | 9 | 26 |
| | | 3 YEARS AND UNDER | 8 | 12 | 9 | 15 |
| | | 3 TO 12 YEARS | 12 | 14 | 14 | 22 |
| | | 12 YEARS AND OVER | 12 | 18 | 20 | 26 |
| | MALE | COMMON | 8 | 18 | 9 | 26 — D ROW |
| | | 3 YEARS AND UNDER | 8 | 12 | 9 | 15 |
| | | 3 TO 12 YEARS | 12 | 14 | 15 | 22 |
| | | 12 YEARS AND OVER | 13 | 18 | 22 | 26 — C ROW |
| | FEMALE | COMMON | 8 | 16 | 9 | 24 |
| | | 3 YEARS AND UNDER | 8 | 12 | 9 | 14 |
| | | 3 TO 12 YEARS | 11 | 14 | 14 | 20 |
| | | 12 YEARS AND OVER | 12 | 17 | 19 | 24 |

FIG. 11

(D) REFERENCE-VALUE BY RACE, SEX, AGE AND PHYSIQUE CALCULATION TABLE

| | | | PHYSIQUE | WIDTH | | LENGTH | |
|---|---|---|---|---|---|---|---|
| | | | | MINIMUM | MAXIMUM | MINIMUM | MAXIMUM |
| ASIANS | COMMON | COMMON | COMMON | 8 | 18 | 9 | 26 |
| | | | NORMAL | 8 | 17 | 9 | 24 |
| | | | TALL | 8 | 18 | 9 | 26 |
| | | 3 YEARS AND UNDER | COMMON | 8 | 12 | 9 | 15 |
| | | | NORMAL | 8 | 12 | 9 | 15 |
| | | | TALL | 8 | 12 | 9 | 15 |
| | | 3 TO 12 YEARS | COMMON | 11 | 14 | 14 | 22 |
| | | | NORMAL | 11 | 13 | 13 | 20 |
| | | | TALL | 12 | 14 | 14 | 22 |
| | | 12 YEARS AND OVER | COMMON | 12 | 18 | 19 | 26 |
| | | | NORMAL | 12 | 16 | 19 | 24 |
| | | | TALL | 13 | 18 | 20 | 26 |
| | MALE | COMMON | COMMON | 8 | 18 | 9 | 26 |
| | | | NORMAL | 8 | 17 | 9 | 24 |
| | | | TALL | 8 | 18 | 9 | 26 |
| | | 3 YEARS AND UNDER | COMMON | 8 | 12 | 9 | 15 |
| | | | NORMAL | 8 | 12 | 9 | 15 |
| | | | TALL | 8 | 12 | 9 | 15 |
| | | 3 TO 12 YEARS | COMMON | 12 | 14 | 15 | 22 |
| | | | NORMAL | 12 | 13 | 15 | 20 |
| | | | TALL | 12 | 14 | 15 | 22 |
| | | 12 YEARS AND OVER | COMMON | 13 | 18 | 22 | 26 |
| | | | NORMAL | 13 | 16 | 22 | 24 |
| | | | TALL | 14 | 18 | 23 | 26 |
| | FEMALE | COMMON | COMMON | 8 | 16 | 9 | 24 |
| | | | NORMAL | 8 | 15 | 9 | 23 |
| | | | TALL | 8 | 16 | 9 | 24 |
| | | 3 YEARS AND UNDER | COMMON | 8 | 12 | 9 | 14 |
| | | | NORMAL | 8 | 12 | 9 | 14 |
| | | | TALL | 8 | 12 | 9 | 14 |
| | | 3 TO 12 YEARS | COMMON | 11 | 14 | 14 | 20 |
| | | | NORMAL | 11 | 13 | 13 | 19 |
| | | | TALL | 12 | 14 | 14 | 20 |
| | | 12 YEARS AND OVER | COMMON | 12 | 17 | 19 | 24 |
| | | | NORMAL | 12 | 15 | 19 | 23 |
| | | | TALL | 13 | 17 | 20 | 24 |

IMAGING APPARATUS, IMAGING APPARATUS CONTROL METHOD, AND COMPUTER PROGRAM PRODUCT, WITH EYE BLINK DETECTION FEATURES

CROSS-REFERENCES TO RELATED APPLICATIONS

This application is a continuation of U.S. application Ser. No. 11/756,067 filed May 31, 2007 and contains subject matter related to Japanese Patent Application JP 2006-160454 filed in the Japanese Patent Office on Jun. 9, 2006, the entire contents of both of which are incorporated herein by reference.

BACKGROUND OF THE INVENTION

1. Field of the Invention

The present invention relates to an imaging apparatus, an imaging apparatus control method, and a computer program. More specifically, the present invention relates to an imaging apparatus, an imaging apparatus control method, and a computer program that make it possible to perform quick and accurate auto-focus processing for a target subject and prevent, in particular, an auto-focus control error due to a blink.

2. Description of the Related Art

Recently, an auto-focus (AF) mechanism that automatically takes the focus on a subject is mounted on many imaging apparatuses such as a still camera and a video camera. In photographing by general cameras, people are main subjects in a large number of cases. However, the people are present in various positions in photographed images and there are various compositions of the images. From the very beginning, a target subject may be present in a position where a range finding area in an imaging apparatus is not set. To cope with such a problem, it is proposed to recognize a face from an image in an imaging apparatus and set a range finding area in a position of the recognized face to make it possible to focus the imaging apparatus on the face regardless of a composition. For example, a focus control technique based on such face recognition is disclosed in JP-A-2003-107335. Focus control based on this face recognition makes it possible to perform appropriate focus control (focusing) in photographing of various compositions.

In photographing of a person, it is standard practice to target eyes for focusing. An apparatus that specifies eyes of a person as a range finding area and automatically performs focusing in a camera with an area of eyes of a subject as a reference is disclosed in JP-A-2005-128156.

As a method of focus control, a method of judging a level of contrast of imaging data acquired via a lens is known. This is a system for setting a specific area of a photographed image as a signal acquisition area for focus control (a spatial frequency extraction area), judging that the lens is more in focus as contrast of this specific area is higher and that the lens is out of focus when the contrast is low, and driving the lens to a position for increasing the contrast to adjust the focus. Such a focus control processing technique is disclosed in, for example, JP-A-10-213737.

Specifically, a method of extracting a high-frequency component of the specific area, generating integrated data of the high-frequency component extracted, and judging a level of contrast on the basis of the high-frequency component integrated data generated is applied to the method of focus control. In other words, a high-frequency component integrated value of the specific area is calculated for judging the level of the contrast and used as an evaluation value (an AF evaluation value). Auto-focus is realized by driving a focus lens to maximize the evaluation value. To perform the auto-focus, it is necessary to drive the lens with the evaluation value as a guideline. As a lens driving mechanism, for example, a voice coil motor is used.

However, in the auto-focus using an image contrast signal, if an area including eyes is set as the specific area to judge the level of the contrast, the contrast substantially changes when a person blinks during an auto-focus operation. As a result, it is difficult to perform accurate distance measurement and focus control.

The auto-focus using a contrast signal is on the premise that fluctuation in the contrast depends on only a change of focus. However, when the person blinks, a change in the contrast signal is caused simply by the blink. Thus, it is difficult to judge a contrast signal change due to movement of the focus and judge a focus position where the lens is focused.

A specific example will be explained with reference to FIG. 1. (A) and (B) in FIG. 1 are diagrams of an example in which a focus lens is moved from a close range side to an infinite side and an evaluation value indicating a level of contrast of a specific area including eyes of a person is measured. In (A) in FIG. 1, the person does not blink and, in (B) in FIG. 1, the person blinks.

In auto-focus processing in the case of (A) in FIG. 1 in which the person does not blink, fluctuation in contrast occurs depending on only a change in focus. Accurate focus control in which a peak position of an evaluation value corresponds to a focus position is performed. On the other hand, in the case of (B) in FIG. 1 in which the person blinks, a change in an image itself including the specific area including the eyes occurs, a change in contrast occurs on the basis of an image change due to a blink rather than a change in focus, and a peak position of an evaluation value is different from a focus position. Thus, accurate focus control is not performed.

SUMMARY OF THE INVENTION

Therefore, it is desirable to provide an imaging apparatus, an imaging apparatus control method, and a computer program that makes it possible to perform quick and accurate auto-focus processing for a target subject and prevent, in particular, a focus control error due to a blink.

Since a human blink is an involuntary movement and psychologically affected, it is difficult to predict timing of the blink. Therefore, it is desirable to provide an imaging apparatus, an imaging apparatus control method, and a computer program for monitoring occurrence of a blink during auto-focus control and performs processing complying with information of the monitoring to prevent a focus control error due to a blink.

According to an embodiment of the invention, there is provided an imaging apparatus including a focus control unit that sets an image area including eyes, which is included in an input image inputted in the imaging apparatus, as a range finding area for calculation of a subject distance and acquires an evaluation value based on contrast of the range finding area to detect a focus position and a blink detecting unit that detects presence or absence of a blink on the basis of image analysis in the range finding area. The focus control unit inputs blink detection information in the blink detection unit, identifies evaluation value data in a blink period and a non-blink period, and executes processing for detecting a focus position on the basis of only an evaluation value in a period judged as the non-blink period.

According the embodiment of the invention, the focus control unit stands by for finish of the blink when detection information indicating that a person is blinking is inputted from the blink detecting unit before the start of driving of a focus lens for acquisition of an evaluation value and executes, after confirming that the blink is finished, control for starting the driving of the focus lens for acquisition of an evaluation value.

According to the embodiment of the invention, the focus control unit stops, when blink detection information indicating that a person has blinked is inputted from the blink detecting unit after the start of driving of a focus lens for acquisition of an evaluation value, the driving of the focus lens to suspend the acquisition of an evaluation value and executes processing for returning the focus lens to a focus lens setting position before the person blinks.

According to the embodiment of the invention, the focus control unit executes the processing for returning the focus lens to the focus lens setting position before a person blinks taking into account a time difference between blink detection processing and evaluation value calculation processing.

According to the embodiment of the invention, the focus control unit judges, when blink detection information indicating that a person has blinked is inputted from the blink detecting unit after the start of driving of a focus lens for acquisition of an evaluation value, whether a peak of an evaluation value has been detected and, when the peak has been detected, determines a focus position on the basis of the peak and finishes focus position detection processing.

According to the embodiment of the invention, the focus control unit judges, when blink detection information indicating that a person has blinked is inputted from the blink detecting unit after the start of driving of a focus lens for acquisition of an evaluation value, whether a peak of an evaluation value has been detected and, when the peak has not been detected, executes, after confirming that the blink is finished, acquisition of an evaluation value from a focus lens setting position before the person blinks.

According to the embodiment of the invention, the imaging apparatus further includes a subject-distance calculating unit that calculates a subject distance on the basis of a size of a face included in the input image. The focus control unit executes comparison of a subject distance based on an evaluation value corresponding to contrast and the subject distance calculated on the basis of the size of the face and, when there is a difference equal to or larger than a threshold set in advance between both the distances, executes evaluation value acquisition processing based on the contrast again.

According to the embodiment of the invention, the subject-distance calculating unit inputs subject information of at least one of a race, a sex, an age, and a physique in subject distance calculation processing based on a size of a face detected by a face detecting unit and executes, on the basis of the subject information inputted, subject distance calculation processing to which a reference value of a size of a face corresponding to the subject is applied.

According to the embodiment of the invention, the subject information of at least one of the race, the sex, the age, and the physique is information inputted to the subject-distance calculating unit as an analysis result in an image analyzing unit for the input image inputted in the imaging apparatus.

According to the embodiment of the invention, the subject information of at least one of the race, the sex, the age, and the physique is information inputted to the subject-distance calculating unit via a user input unit in the imaging apparatus.

According to the embodiment of the invention, the focus control unit repeatedly executes evaluation value acquisition processing based on the contrast of the range finding area plural times, compares plural result data acquired, and, when same evaluation data are acquired, determines a focus position according to majority processing for setting the evaluation value data as proper evaluation data.

According to another embodiment of the invention, there is provided an imaging apparatus control method of executing auto-focus control in an imaging apparatus, the imaging apparatus control method including a focus control step of setting, in a focus control unit, an image area including eyes, which is included in an input image of the imaging apparatus, as a range finding area for calculation of a subject distance and acquiring an evaluation value based on contrast of the range finding area to detect a focus position and a blink detecting step of detecting, in a blink detecting unit, presence or absence of a blink on the basis of image analysis in the range finding area. The focus control step is a step of inputting blink detection information in the blink detection unit, identifying evaluation value data in a blink period and a non-blink period, and executing processing for detecting a focus position on the basis of only an evaluation value in a period judged as the non-blink period.

According the embodiment of the invention, the focus control step includes a step of standing by for finish of the blink when detection information indicating that a person is blinking is inputted from the blink detecting unit before the start of driving of a focus lens for acquisition of an evaluation value and executing, after confirming that the blink is finished, control for starting the driving of the focus lens for acquisition of an evaluation value.

According to the embodiment of the invention, the focus control step includes a step of stopping, when blink detection information indicating that a person has blinked is inputted from the blink detecting unit after the start of driving of a focus lens for acquisition of an evaluation value, the driving of the focus lens to suspend the acquisition of an evaluation value and executing processing for returning the focus lens to a focus lens setting position before the person blinks.

According to the embodiment of the invention, in the focus control step, the processing for returning the focus lens to the focus lens setting position before a person blinks is executed taking into account a time difference between blink detection processing and evaluation value calculation processing.

According to the embodiment of the invention, the focus control step includes a step of judging, when blink detection information indicating that a person has blinked is inputted from the blink detecting unit after the start of driving of a focus lens for acquisition of an evaluation value, whether a peak of an evaluation value has been detected and, when the peak has been detected, determining a focus position on the basis of the peak and finishing focus position detection processing.

According to the embodiment of the invention, the focus control step includes a step of judging, when blink detection information indicating that a person has blinked is inputted from the blink detecting unit after the start of driving of a focus lens for acquisition of an evaluation value, whether a peak of an evaluation value has been detected and, when the peak has not been detected, executing, after confirming that the blink is finished, acquisition of an evaluation value from a focus lens setting position before the person blinks.

According to the embodiment of the invention, the imaging apparatus control method further includes a subject-distance calculating step of calculating, in a subject-distance calculating unit, a subject distance on the basis of a size of a face included in the input image. The focus control step includes a step of executing comparison of a subject distance based on an evaluation value corresponding to contrast and the subject distance calculated on the basis of the size of the face and, when there is a difference equal to or larger than a threshold set in advance between both the distances, executing evaluation value acquisition processing based on the contrast again.

According to the embodiment of the invention, the subject-distance calculating step includes a step of inputting subject information of at least one of a race, a sex, an age, and a physique in subject distance calculation processing based on a size of a face detected by a face detecting unit and executing, on the basis of the subject information inputted, subject distance calculation processing to which a reference value of a size of a face corresponding to the subject is applied.

According to the embodiment of the invention, the focus control step includes a step of repeatedly executing evaluation value acquisition processing based on the contrast of the range finding area plural times, comparing plural result data acquired, and, when same evaluation data are acquired, determining a focus position according to majority processing for setting the evaluation value data as proper evaluation data.

According to still another embodiment of the invention, there is provided a computer program for causing an imaging apparatus to execute auto-focus control, the computer program including a focus control step of setting, in a focus control unit, an image area including eyes, which is included in an input image of the imaging apparatus, as a range finding area for calculation of a subject distance and acquiring an evaluation value based on contrast of the range finding area to detect a focus position and a blink detecting step of detecting, in a blink detecting unit, presence or absence of a blink on the basis of image analysis in the range finding area. The focus control step is a step of inputting blink detection information in the blink detection unit, identifying evaluation value data in a blink period and a non-blink period, and executing processing for detecting a focus position on the basis of only an evaluation value in a period judged as the non-blink period.

The computer program according to the embodiment of the invention is a computer program that can be provided to, for example, a computer system capable of executing various program codes through a storage medium provided in a computer readable format, a communication medium, recording media such as a CD, an FD, and an MO, or a communication medium such as a network. By providing such a program in a computer readable format, processing corresponding to the program is realized on the computer system.

Other objects, characteristics, and advantages of the invention will be apparent through more detailed explanations based on embodiments of the invention described later and attached drawings. In this specification, a system is a logical set of plural apparatuses and is not limited to apparatuses of various structures housed in an identical housing.

According to an embodiment of the invention, in the focus control processing for setting an image area including eyes, which is included in an input image in the imaging apparatus, as a range finding area for calculation of a subject distance and acquiring an evaluation value based on contrast of the range finding area to detect a focus position, blink detection information is inputted, evaluation data in a blink period and a non-blink period are identified, and processing for detecting a focus position is executed on the basis of only an evaluation value in a period judged as the non-blink period. Thus, it is possible to prevent occurrence of a focus error due to a contrast change based on a blink.

According to an embodiment of the invention, even when blink detection is not performed satisfactorily, for example, comparison of subject distance information based on a size of a face and a subject distance calculated from an evaluation value is executed to discriminate whether correct evaluation value acquisition and evaluation value acquisition data acquired in plural times of searches are compared to acquire correct evaluation value data according to a decision by majority. Thus, even when blink detection is not performed satisfactorily, focus control based on an accurate evaluation value is realized.

BRIEF DESCRIPTION OF THE DRAWINGS

FIG. 1 shows diagrams for explaining AF evaluation value calculation and an influence of a blink in auto-focus processing;

FIGS. 2A to 2C are diagrams for explaining an example of an external structure of an imaging apparatus according to an embodiment of the invention;

FIG. 8 is a diagram for explaining a structure and processing of a face-size-reference-value calculating unit;

FIG. 9 shows diagrams for explaining examples of a reference value calculation table applied to calculation in the face-size-reference-value calculating unit;

FIG. 10 is a diagram for explaining an example of the reference value calculation table applied to calculation in the face-size-reference-value calculating unit;

FIG. 11 is a diagram for explaining an example of the reference value calculation table applied to calculation in the face-size-reference-value calculating unit;

DESCRIPTION OF THE PREFERRED EMBODIMENTS

Figure 3:
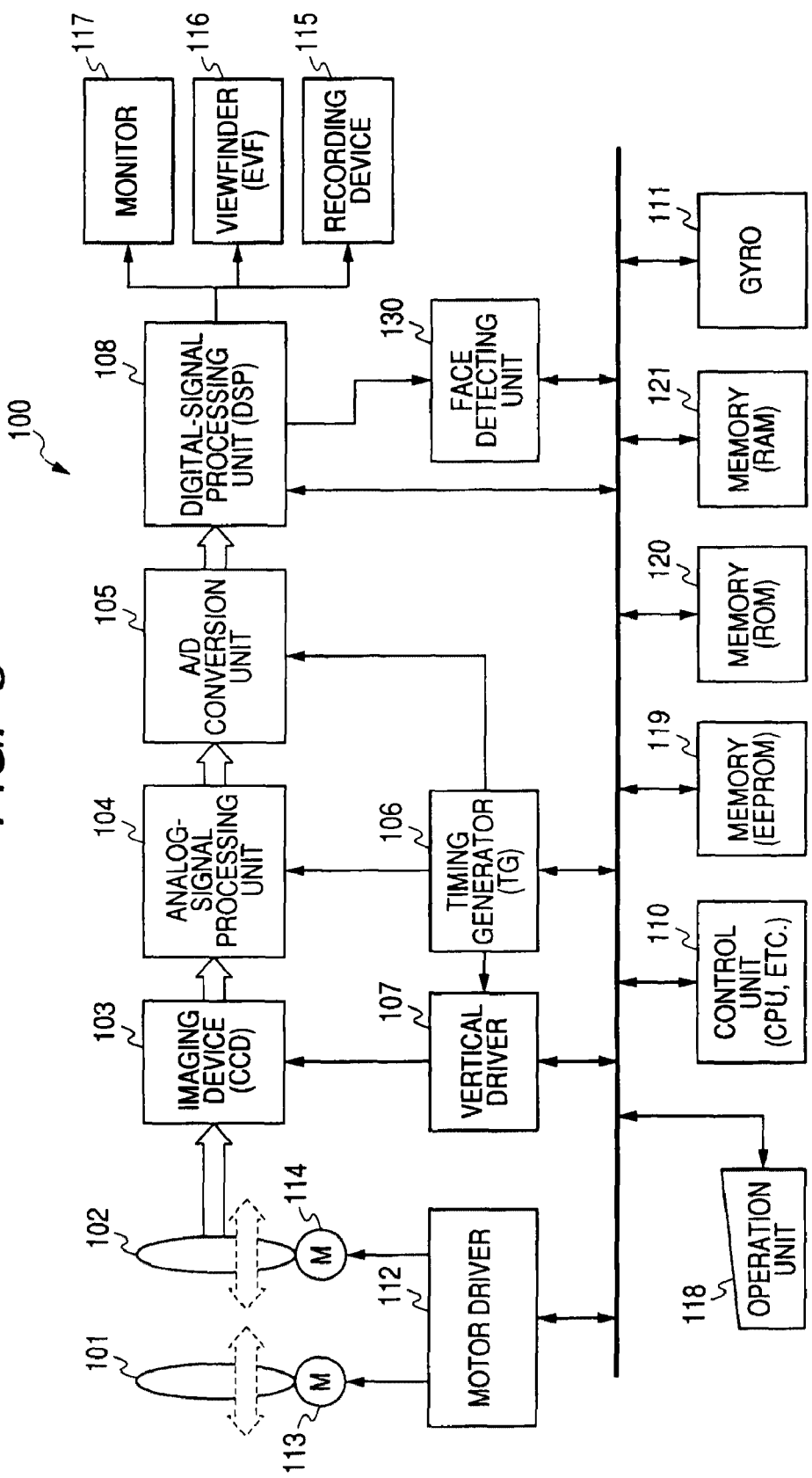
FIG. 3 is a diagram for explaining an example of a hardware configuration of the imaging apparatus according to the embodiment.

Details of an imaging apparatus, an imaging apparatus control method, and a computer program according to an embodiment of the invention will be hereinafter explained with reference to the accompanying drawings.

In the embodiment of the invention, a technique for making it possible to perform quick and accurate auto-focus for a target subject is disclosed. In the imaging apparatus according to the embodiment, as a method of focus control, a method of judging a level of contrast of imaging data acquired via a lens is used as a basis. The imaging apparatus sets a specific area including eyes of a face of a person included in a photographed image as a signal acquisition area (a spatial frequency extraction area) for focus control, judges that the lens is more in focus as contrast of this specific area is higher and that the lens is out of focus when the contrast is low, and drives the lens to increase the contrast and adjust the focus.

Specifically, the imaging apparatus extracts a high-frequency component of the specific area including the eyes, generates integrated data of the high-frequency component extracted, and judges a level of contrast on the basis of the high-frequency component integrated data generated. In other words, the imaging apparatus calculates a high-frequency component integrated value of the specific area to judge the level of the contrast and uses this high-frequency component integrated value as an evaluation value (an AF evaluation value). Auto-focus is realized by driving a focus lens to maximize the evaluation value. To perform the auto-focus, it is necessary to drive the lens with the evaluation value as a guideline. As a lens driving mechanism, for example, a voice coil motor is used.

In this embodiment, presence or absence of a blink is detected, processing is changed on the basis of detection information, and an accurate focus point (a focus position) is determined in this auto-focus processing.

First, a structure of the imaging apparatus according to this embodiment will be explained with reference to the drawings. FIGS. 2A to 2C are diagrams showing an external appearance of an imaging apparatus 10. FIG. 2A is a plan view of the imaging apparatus 10, FIG. 2B is a front view of the imaging apparatus 10, and FIG. 2C is a rearview of the imaging apparatus 10. A lens portion of the plan view in FIG. 2A is shown as a sectional view. The imaging apparatus 10 has a power supply switch 11, trigger means for setting image capturing timing, i.e., a release switch 12 functioning as a shutter, a monitor 13 that displays an image (a through image) photographed by the imaging apparatus, operation information, and the like, an imager 14 as an imaging device (a CCD), zoom buttons 15 for performing zoom control, operation buttons 16 for inputting various kinds of operation information, a viewfinder 17 for checking the image (the through image) photographed by the imaging apparatus, a focus lens 18 driven in focus adjustment, a zoom lens 19 driven in zoom adjustment, a mode dial 20 for setting a photographing mode, a focus lens motor (M1) 21 for driving the focus lens 18, and a zoom lens motor (M2) 22 for driving the zoom lens 19.

A subject image is displayed on the viewfinder 17 and the monitor 13. The viewfinder 17 and the monitor 13 are constituted by, for example, LCDs. The subject image obtained through the lenses is displayed on the viewfinder 17 and the monitor 13 as a moving image. This moving image is called a through image. A user checks the viewfinder 17 or the monitor 13, checks a target subject to be photographed, and presses the release switch 12 as the shutter to execute recording processing for the image.

An internal structure of an imaging apparatus 100 according to this embodiment will be explained with reference to FIG. 3. The imaging apparatus according to this embodiment is an imaging apparatus having an auto-focus function. Incident light through a focus lens 101 and a zoom lens 102 is inputted to an imaging device 103 such as a CCD (Charge Coupled Device) and photoelectrically converted in the imaging device 103. Photoelectrically converted data is inputted to an analog-signal processing unit 104, subjected to processing such as noise removal in the analog-signal processing unit 104, and converted into a digital signal in an A/D conversion unit 105. The data converted into the digital signal in the A/D conversion unit 105 is recorded in a recording device 115 constituted by a flash memory or the like. The data is further displayed on a monitor 117 and a viewfinder (EVF) 116. An image obtained through the lenses is displayed as a through image on the monitor 117 and the viewfinder (EVF) 116 regardless of whether photographing is performed.

An operation unit 118 is an operation unit including the release switch 12, the zoom buttons 15, the operation buttons 16 for inputting various kinds of operation information, and the mode dial 20 for setting a photographing mode provided in a camera main body explained with referenced to FIGS. 2A to 2C. A control unit 110 has a CPU and executes control of various kinds of processing executed by the imaging apparatus in accordance with programs stored in a memory (ROM) 120 and the like in advance. A memory (EEPROM) 119 is a nonvolatile memory. Image data, various kinds of supplementary information, programs, and the like are stored in the memory 119. The memory (ROM) 120 stores programs, arithmetic operation parameters, and the like used by the control unit (the CPU) 110. A memory (RAM) 121 stores programs used in the control unit (the CPU) 110, parameters that change in execution of the programs as appropriate, and the like. A gyro 111 detects an inclination, a shake, and the like of the imaging apparatus. Detection information is inputted to the control unit (the CPU) 110 and processing such as hand shake prevention is executed.

A motor driver 112 drives a focus-lens driving motor 113 set in association with the focus lens 101 and a zoom-lens driving motor 114 set in association with the zoom lens 102. A vertical driver 107 drives the imaging device (the CCD) 103. A timing generator 106 generates a control signal for processing timing of the imaging device 103 and the analog-signal processing unit 104 and controls the processing timing of these processing units.

A face detecting unit 130 analyzes image data inputted through the lenses and detects a face and an area of eyes of a person in the image data. Detection information is sent to the control unit 110. The control unit 110 specifies the face and the area of the eyes of the person as a target subject on the basis of the detection information and measures a distance to the subject on the basis of this specified area.

In the imaging apparatus according to this embodiment, as described above, in focus control, the method of judging a level of contrast in imaging data acquired through the lenses is used as a basis. In this focus control using contrast identification processing, the imaging apparatus further detects presence or absence of a blink, changes processing on the basis of detection information, and determines an accurate focus point (focus position).

In processing for judging a focus position based on contrast, the imaging apparatus calculates a high-frequency component integrated value of a specific area and uses this high-frequency component integrated value as an evaluation value (an AF evaluation value). Auto-focus is realized by driving a focus lens to maximize the evaluation value. As specific auto-focus control processing, there are a method of applying servo to the focus lens such that the AF evaluation value keeps a peak (a hill-climbing method), a method of moving the focus lens to a focus position obtained by calculating evaluation value data of a specific interval in a specific area and calculating a maximum value of evaluation values of the evaluation value data (a candidate range search method), and the like.

The imaging apparatus according to this embodiment specifies a face and an area of eyes of a person as a target subject from image data photographed by the imaging apparatus and executes distance estimation based on a specific area including the eyes. A specific processing constitution for this processing will be hereinafter explained. Explanations will be made in the following order of items.

(1) Face and eyes recognition processing (2) Blink detection and processing for coping with the blink (3) Subject distance calculation processing based on a size of a face (4) Processing based on a majority method (1) Face and Eyes Recognition Processing First, a method of specifying a face and an area of eyes of a person from image data acquired by the imaging apparatus will be explained. As a technique for recognizing and tracking a face, various techniques have already been disclosed. It is possible to apply these existing techniques to the technique for recognizing and tracking a face. The technique can be realized by matching of a template having luminance distribution information of a face recorded therein to an actual image described in, for example, JP-A-2004-133637. First, plural kinds of images obtained by applying reduction processing to the actual image are prepared. A group of luminance distribution information templates of a face obtained when a person leans the face is prepared in advance. Matching of the images and the templates is subsequently performed. The templates are templates inclined with respect to each of X, Y, and Z axes of a face three-dimensional orthogonal coordinate system. An actual inclination of the face is judged according to matching with the templates.

When the matching of the reduced images with the templates is sequentially performed while shifting the images on a two-dimensional plane, if a certain area matches the templates, the area is a position where the face is present. It is possible to calculate a size of the face from a reduction ratio of the actual image. It is possible to calculate a rotation angle, a yaw, a pitch, and a roll angle around the orthogonal three axes from the templates used in the matching. An area of the eyes is estimated from data of the face obtained in this way. An area of the eyes is specified from a luminance distribution of the estimated area. A range finding area, which is a specific area for distance measurement, is set in an image area of the eyes calculated in this way. An example of specific setting of a range finding area is shown in FIGS. 4A and 4B.

Figure 4:
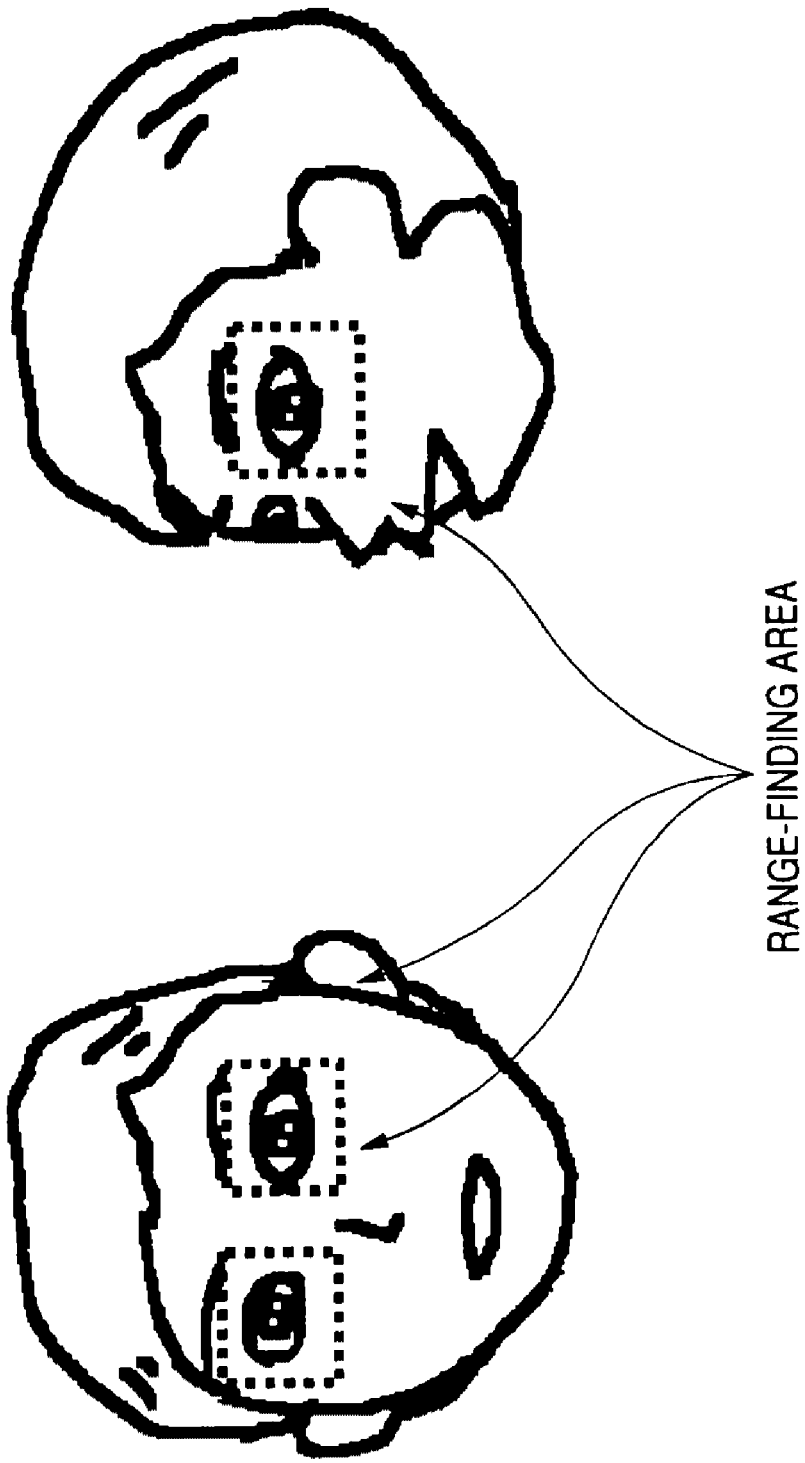
FIGS. 4A and 4B are diagrams for explaining an example of setting of a range finding area.

FIG. 4A is an example of a range finding area set in respective areas of two eyes from a face image facing forward and FIG. 4B is an example of a range finding area set in an area of one eye from a face image facing sideway.

The imaging apparatus executes, as a basis, control for acquiring an image of this range finding area through the lenses, judging a level of contrast by moving the focus lens, and setting a position where the contrast is the highest, i.e., a position where an AF evaluation value is high as a focus position. Moreover, the imaging apparatus according to this embodiment detects presence or absence of a blink, changes processing on the basis of detection information, and determines an accurate focus point (a focus position).

(2) Blink Detection and Processing for Coping with the Blink

The imaging apparatus according to this embodiment judges whether the person has blinked the eyes in the set range finding area during focus control processing for judging a level of contrast by moving the focus lens. Processing for judging presence or absence of a blink is performed by monitoring color fluctuation in a position judged as eyes. In other words, the imaging apparatus executes analysis of an image area judged as eyes and executes blink judgment processing for judging that the person is blinking when a white area is reduced or the white area has disappeared.

Figure 5:
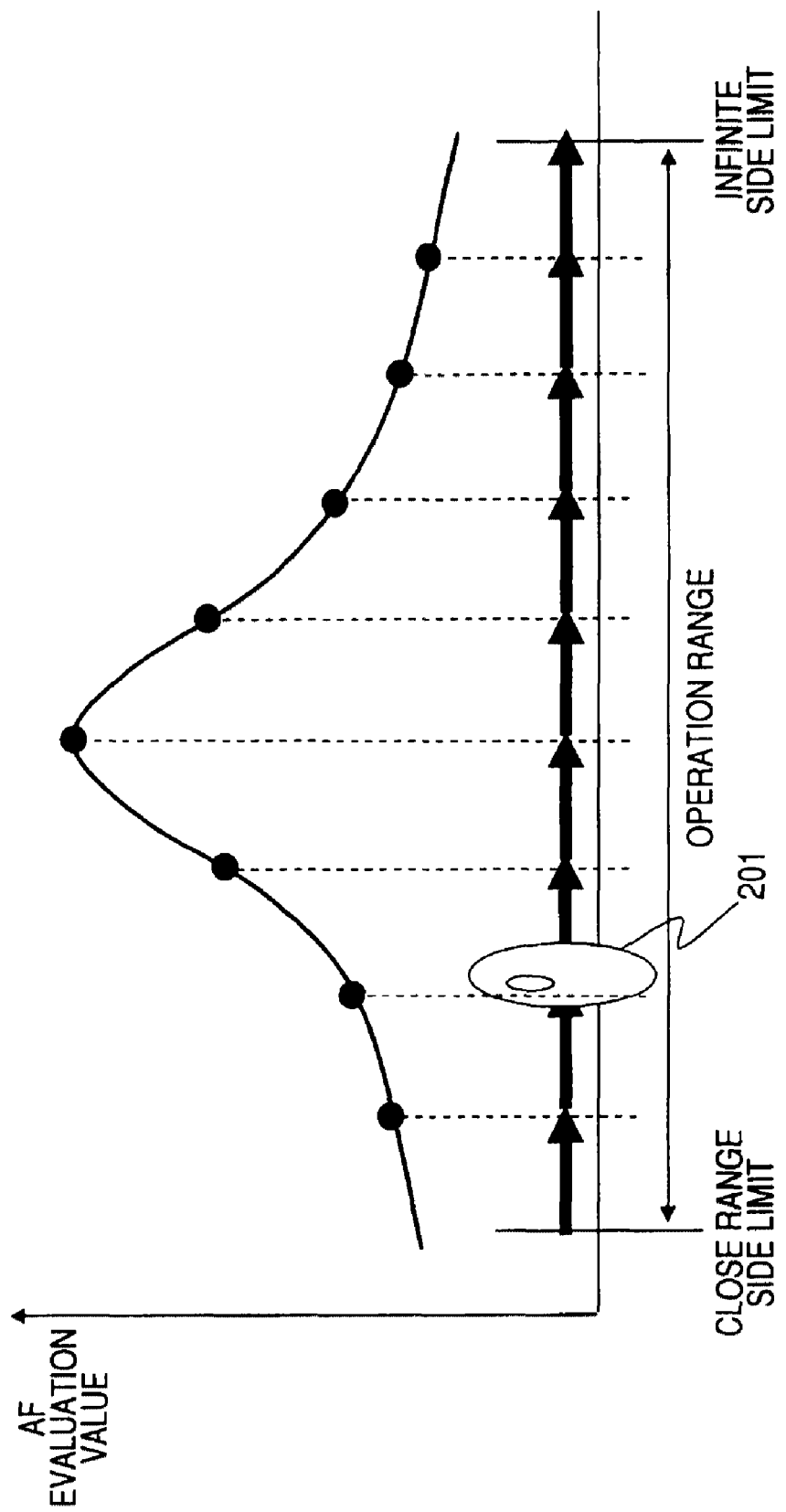
FIG. 5 is a diagram for explaining examples of lens driving and AF evaluation value measurement in focus control of the imaging apparatus according to the embodiment.

In auto-focus processing, for example, the imaging apparatus executes, as a basis, processing for sequentially moving a focus lens 201 from a close range side to an infinite side as shown in FIG. 5, measuring an AF evaluation value equivalent to a level of contrast in the range finding area including the eyes at each moving point, and setting a peak position of the AF evaluation value as a focus point (a focus position).

A sequence of the auto-focus processing including the blink detection and the processing for coping with the blink according to this embodiment will be explained. The imaging apparatus according to this embodiment executes acquisition of detection data in a range finding area including eyes and blink judgment and prevents defocus due to a blink by applying a processing method explained below to the auto-focus processing.

(Processing "a") Processing Before Starting Evaluation Value Search

On the basis of half-press of a shutter, when a blink is detected during execution of preparation processing for an evaluation value search for acquisition of a contrast signal, i.e., processing for searching for an AF evaluation value corresponding to a measurement value of contrast corresponding to movement of the focus lens, the imaging apparatus moves the focus lens to a search start position, completes preparation for auto-focus, and stands by for finish of the blink. Thereafter, after confirming the finish of the blink, the imaging apparatus starts the evaluation value search.

(Processing "b") Processing 1 after Starting Evaluation Value Search

When a blink is detected during the evaluation value search, if the detection of the blink is before the evaluation value forms a peak, the imaging apparatus stands by at a point of the detection until the blink is finished. Here, when there is a time difference "delay": Td in the detection of the blink of the eyes, the imaging apparatus returns by a distance of the movement of the lens in this time: Td and stands by at this point and resumes the search from the point immediately after the blink is finished.

(Processing "c") Processing 2 after Starting Evaluation Value Search

When there is a time difference (Delay) in acquisition of a luminance difference evaluation value with respect to the blink detection, if it is possible to confirm that the delayed evaluation value forms a peak during the standby for finish of the blink, the imaging apparatus judges this peak as a focus point and finishes the search.

(Processing "d") Processing 3 after Starting Evaluation Value Search

When the blink is not finished even if the standby for finish of the blink is continued for a fixed time, the imaging apparatus judges that the person has closed the eyes, clears a search result obtained, and starts a new search from that point.

Figure 6:
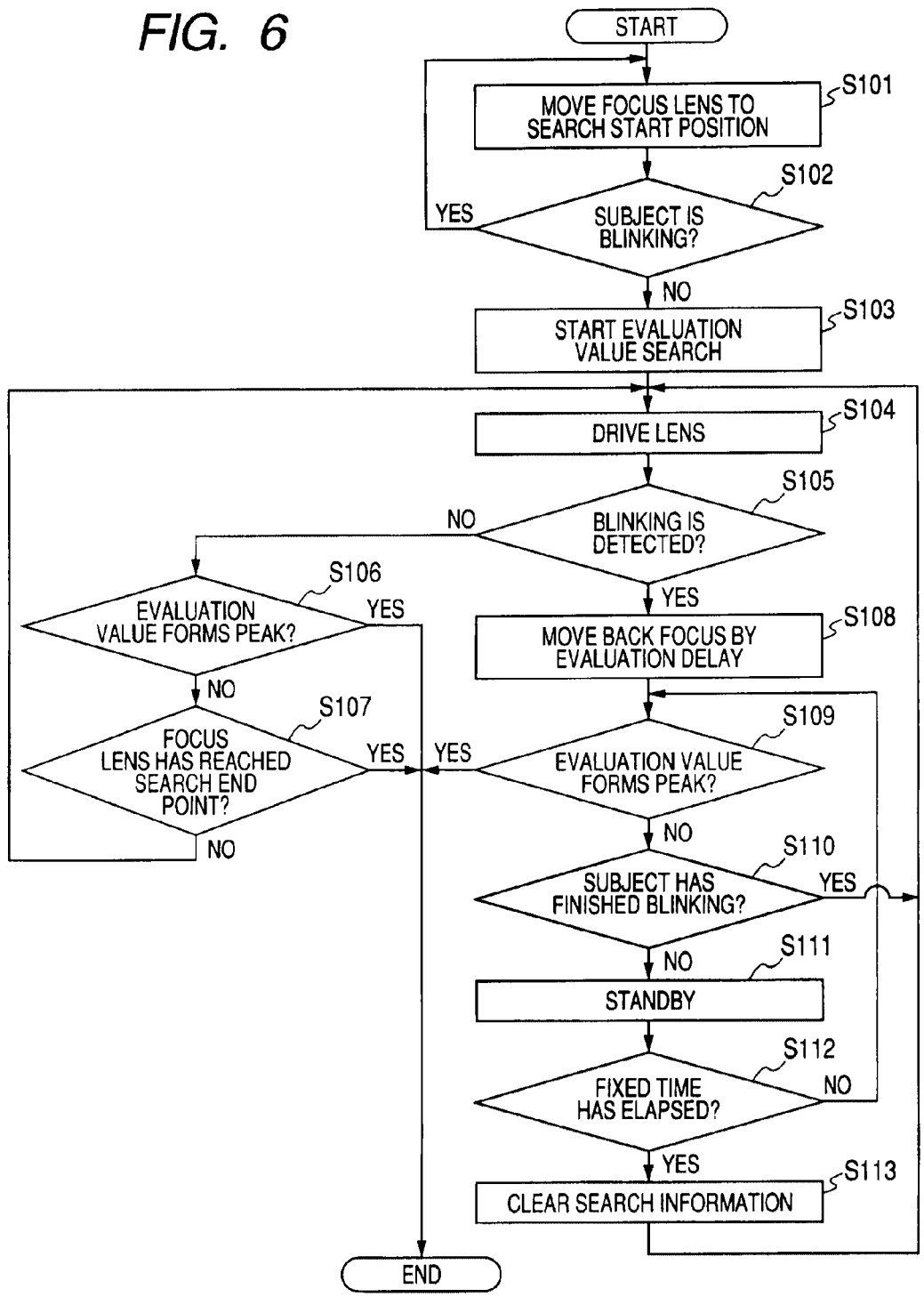
FIG. 6 is a flowchart for explaining an auto-focus control sequence of the imaging apparatus according to the embodiment.

A sequence of the auto-focus processing including the blink detection and the processing for coping with the blink according to this embodiment including the processing described above will be explained with reference to a flowchart shown in FIG. 6. The flowchart shown in FIG. 6 is a flowchart of processing executed under the control by the control unit 110 of the imaging apparatus shown in FIG. 3. This processing is executed after an area of eyes of a person in an image is detected in the face detecting unit 130 on the basis of an analysis of an input image obtained through the lenses and an image area including the area of the eyes is set as a specific area (a range finding area) for AF evaluation value calculation.

First, in step S101, the control unit 110 moves the focus lens to a search start position. This corresponds to the processing "a" described above. In other words, on the basis of shutter half-press, to start an evaluation value search for acquisition of a contrast signal as an AF evaluation, the control unit 110 moves the focus lens to the search start position, for example, a close range side limit.

In step S102, the control unit 110 judges whether a person is blinking. This processing is performed by detecting a change in a color in an image area including a position judged as eyes as described above. In other words, the control unit 110 executes an analysis of the image area judged as eyes, i.e., a specific area (a range finding area) and detects a change in a ratio of a white area in this image area. Specifically, the control unit 110 judges that the person is blinking when the white area is reduced or the white area has disappeared.

When it is judged in step S102 that the person is blinking, the control unit 110 returns to step S101. In other words, the control unit stands by in a state in which the focus lens is moved to the search start position. When it is judged in step S102 that the person is not blinking yet, the control unit 110 proceeds to step S103 and starts an evaluation value search. In other words, in step S104, the control unit 110 starts processing for moving the focus lens and acquiring an evaluation value.

The control unit 110 monitors presence or absence of a blink even during the evaluation value acquisition processing. When a blink is not detected in step S105 and it is judged in step S106 that an evaluation value forms a peak, the control unit 110 judges that a point of peak formation is a focus position and finishes the processing. When a peak of the evaluation value is not detected in step S106, the control unit 110 confirms that the search has reached an end point (e.g., an infinite side limit) and finishes the processing.

On the other hand, during the execution of the search as the evaluation value acquisition processing, when a blink is detected in step S105, the control unit 110 proceeds to step S108 and executes processing for returning the lens by a distance of movement of the lens equivalent to temporal "delay" of the blink detection. This is equivalent to the processing "b" and is processing for returning by a distance of movement of the lens in the time of the detection delay: Td, standing by at this point, and, immediately after the blink is finished, resuming the search from the point.

Subsequently, in step S109, the control unit 110 judges whether the evaluation value has formed a peak. This processing for judging formation of a peak of the evaluation value is a measure taken when there is a delay in evaluation value detection and is equivalent to the processing "c". When there is a time difference (Delay) in acquisition of a luminance difference evaluation value with respect to the blink detection, if it is possible to confirm that the delayed evaluation value forms a peak during the standby for finish of the blink, the control unit 110 judges this peak as a focus point and finishes the search (Yes in S109).

When it is difficult to confirm in step S109 that the evaluation value forms a peak, the control unit 110 proceeds to step S110 and confirms that the blink is finished. On the basis of the confirmation, the control unit 110 returns to step S104 and resumes the search. A position of the lens in this case is calculated from the lens position set in step S108. The evaluation value data acquired by the processing is used as it is.

When the control unit 110 proceeds to step S110, the blink is not finished, stands by in step S111, and a fixed time set in advance has elapsed (Yes in step S112), the control unit 110 judges that the person closed the eyes. In step S113, the control unit 110 clears search results to that point and starts a new search from the point. This processing is processing corresponding to the processing "d".

In this way, in this embodiment, presence or absence of a blink is detected before starting the search for acquisition of an AF evaluation value and during execution of the search. Before starting the search, the search is started after standing by for finish of the blink. During execution of the search, a processing form is changed according to detection of a peak of an evaluation value. In this way, efficient acquisition of an AF evaluation value without waste of operations is realized and occurrence of a focus error due to a blink is prevented.

(3) Subject Distance Calculation Processing Based on a Size of a Face

An example of processing also using subject distance calculation processing based on a size of a face as a measure at the time when blink detection is not accurately executed will be explained. It is conceivable that, when an area including eyes of a person as a subject is set as a range finding area and a blink is detected on the basis of a change in an image in the area, i.e., an increase and a decrease of a white area, the imaging apparatus fails in the blink detection. In such a case, there is a concern that a focus moving position substantially deviates from a position where the lens should be focused. Processing for comparing a distance of a focus position and a distance physically calculated from information on a size of a face and, when the distances deviate from each other by a fixed value or more, performing the search again to prevent shift of a focus will be hereinafter explained.

Figure 7:
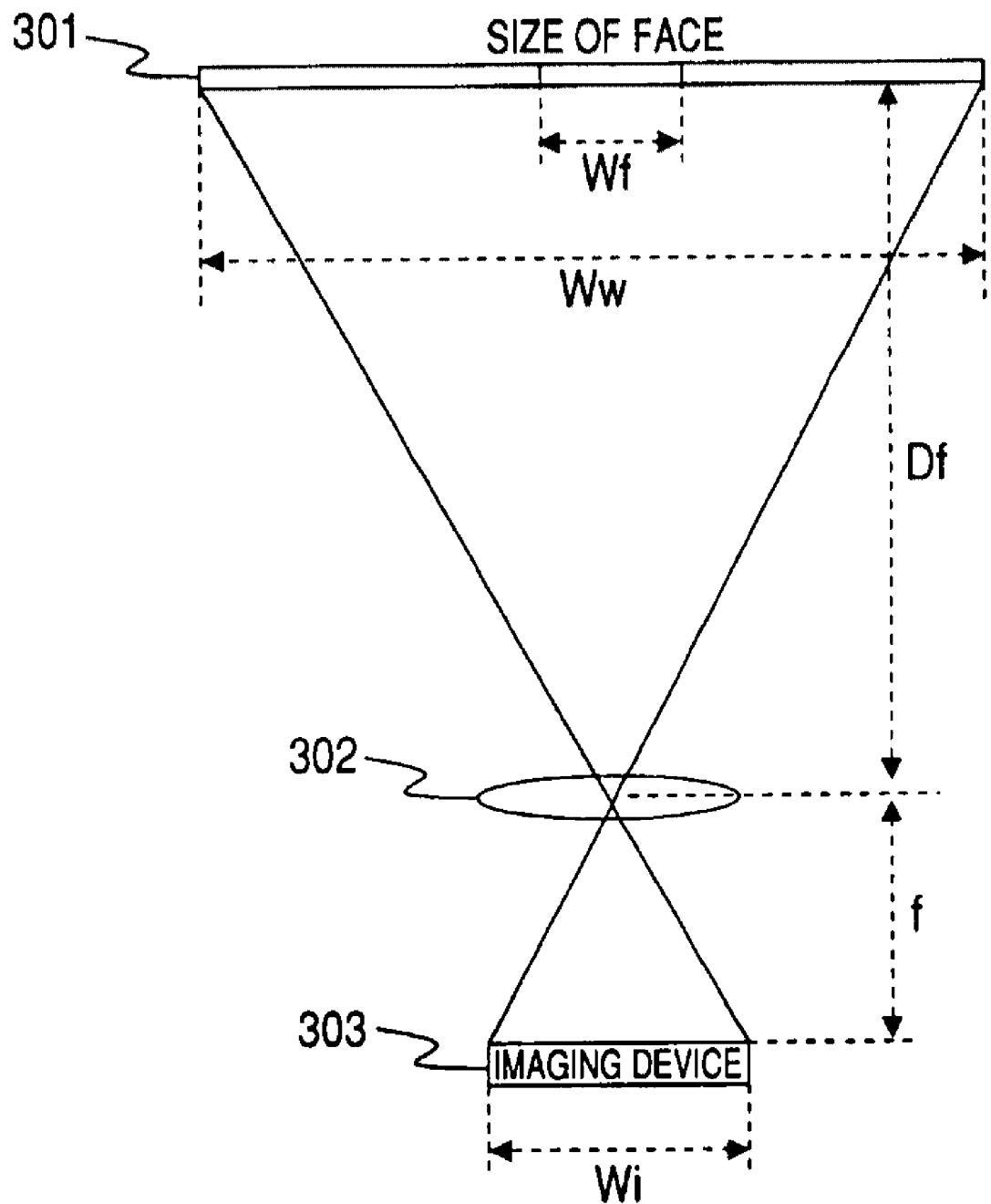
FIG. 7 is a diagram for explaining subject-distance calculation processing based on a size of a face.

In this embodiment, a distance to a face is calculated according to a size of the face included in an image photographed by the imaging apparatus. This processing will be explained with reference to FIG. 7. A subject position 301, a focus lens 302, and an imaging device 303 are shown in FIG. 7. A face of a person is present in the subject position 301. A size of the face (the width of the face) is Wf.

If the actual size (Wf) of the face is known, from a basic physical law of lenses, it is possible to calculate a distance to the face, i.e., a subject distance (Df), which is a distance (Df) from the focus lens 302 to the subject position 301, according to the following equation.

$$Df=Wref\times(f/Wi)\times(Ww/Wf) \quad \text{(Equation 1.1)}$$

where Wref is a reference value of a size of a face of a person, Wi is the width of an imaging device, f is a focal length, Wf is the number of pixels (an imaging device detection value) of a size of the face of the person in a photographed image, and Ww is the number of pixels (an imaging device detection value) of a size of an image used for detection of the face of the person.

It is possible to use a fixed value set in advance as the reference value of a size of a face of a person (Wref). It is possible to perform processing with this face size reference value (Wref) set to a value obtained by taking into account an individual difference, a difference of race, a difference of age, a difference of sex, and the like. According to this processing, it is possible to realize more accurate distance estimation.

This processing will be explained with reference to FIG. 8 and subsequent figures. This processing is processing for setting the face size reference value: Wref to an appropriate value according to a race, a sex, an age, and a physique corresponding to a subject and calculating an accurate subject distance (Df) corresponding to the subject. For this processing, reference values Wref corresponding to various races, sexes, ages, and physiques are calculated and used. For example, table data for calculation of the reference values Wref corresponding to various races, sexes, ages, and physiques is held, race, sex, age, and physique information corresponding to a subject is acquired on the basis of an image analysis result or user input information, and a face size reference value: Wref corresponding to the subject is calculated from the table on the basis of these kinds of acquired information.

According to an analysis of a face image included in an image photographed by the imaging apparatus, it is possible to estimate a race, a sex, an age, and a physique of a person having the face. In other words, parts of the face are identified and matching with parts information corresponding to races, sexes, ages, and physiques registered in advance is executed to estimate a race, a sex, an age, and a physique of the subject. Alternatively, it is also possible that a user like a photographer inputs subject information concerning a race, a sex, an age, and a physique and applies this input information to the analysis.

In this way, the race, sex, age, and physique information of the subject is acquired as image analysis or user input information and a proper face size reference value: Wref corresponding to the subject is calculated. An example of this processing will be explained with reference to FIG. 8.

As shown in FIG. 8, the imaging apparatus has a face-size-reference-value (Wref) calculating unit 310. The face-size-reference-value (Wref) calculating unit 310 has a reference-value-by-race calculation table 311, a reference-value-by-sex calculation table 312, a reference-value-by-age calculation table 313, a reference-value-by-physique calculation table 314, and a data processing unit 320.

An image analyzing unit 331 estimates, according to an analysis of a face image included in an image photographed by the imaging apparatus, a race, a sex, an age, and a physique of a person having the face. In other words, the image analyzing unit 331 identifies parts of the face, executes matching with parts information corresponding to races, sexes, ages, and physiques registered in advance, estimates a race, a sex, an age, and a physique of the subject, and inputs information on the estimation to the face-size-reference-value (Wref) calculating unit 310. Alternatively, the user like the photographer inputs subject information concerning a race, a sex, an age, and a physique via the user input unit 332 and inputs this input information to the face-size-reference-value (Wref) calculating unit 310.

The face-size-reference-value (Wref) calculating unit 310 calculates an optimum reference value (Wref) corresponding to the subject by applying the respective tables to the calculation on the basis of the subject information inputted via the image analyzing unit 331 or the user input unit 332. As an actual output, a reference value range Wref=(Wref+ΔWrefb) to (Wref−ΔWrefs) taking into account a certain degree of variation may be calculated. The face-size-reference-value (Wref) calculating unit 310 outputs a result obtained by taking into account estimated deviation to a large side as ΔWrefb and taking into account estimated deviation to a small side as ΔWrefs.

Examples of a data structure of the tables will be explained with reference to FIGS. 9 to 11. In FIG. 9, (A) is a reference-value-by-race calculation table and (B) is a reference-value by race and sex calculation table. In FIG. 10, (C) is a reference-value by race, sex, and age calculation table. In FIG. 11, (D) is a reference-value by race, sex, age, and physique calculation table. In the explanation of the example of the structure shown in FIG. 8, the separate tables for a race, a sex, an age, and a physique are set. However, rather than setting the separate tables, it is possible to set tables in various forms as shown in FIGS. 9 to 11.

For example, when it is possible to estimate or decide only a race on the basis of the subject information inputted via the image analyzing unit 331 or the user input unit 332, the reference-value-by-race calculation table shown in (A) in FIG. 9 is used. If it is difficult to judge a race, "common" data is used.

When it is possible to estimate or decide a race and a sex on the basis of the subject information inputted via the image analyzing unit 331 or the user input unit 332, the reference-value by race and sex table shown in (B) in FIG. 9 is used. If a person is an Asian and male, data in an A row shown in (B) in FIG. 9 is used. On the other hand, for example, when it is difficult to decide a race of a person but it is possible to estimate or decide a sex of the person as female, data in a B row shown in (B) in FIG. 9 indicating that a race is common and a sex is female is used.

Similarly, when it is possible to estimate or decide a race, a sex, and an age, the reference-value by race, sex, and age calculation table shown in (C) in FIG. 10 is used. If it is known that a person is an Asian male and is twelve years and over, data in a C row shown in (C) in FIG. 10 only has to be used. When it is difficult to estimate an age due to some reason, data in a D row shown in (C) in FIG. 10 only has to be used. Similarly, when it is possible to estimate or decide a race, a sex, an age, and a physique, an optimum reference value Wref=(Wref+ΔWrefb) to (Wref−ΔWrefs) is calculated using the reference-value by race, sex, age, and physique calculation table shown in (D) in FIG. 11.

In this way, it is possible to acquire race, sex, age, and physique information of the subject as image analysis or user input information and calculate a proper face size reference value: Wref corresponding to the subject. It is possible to calculate a more accurate distance (Df) to the subject by applying the reference value: Wref calculated to the calculation. In processing for applying the reference value: Wref and processing for calculation of the distance (Df) to the subject, it is possible to apply any one of the width of the face and the length of the face to the calculation and it is possible to further use both the width and the length. Moreover, an inclination of the face may be taken into account.

Comparison of the distance (Df) to the subject calculated on the basis of the size of the face of the subject in this way and a focus position obtained by detection of a peak of an AF evaluation value based on contrast is executed. When deviation between the distance (Df) and the focus position is larger than a threshold set in advance, the imaging apparatus judges that it is likely that there is an error in the detection of the peak of the AF evaluation value and performs the search again. A sequence of this processing will be explained with reference to a flowchart shown in FIG. 12.

Figure 12:
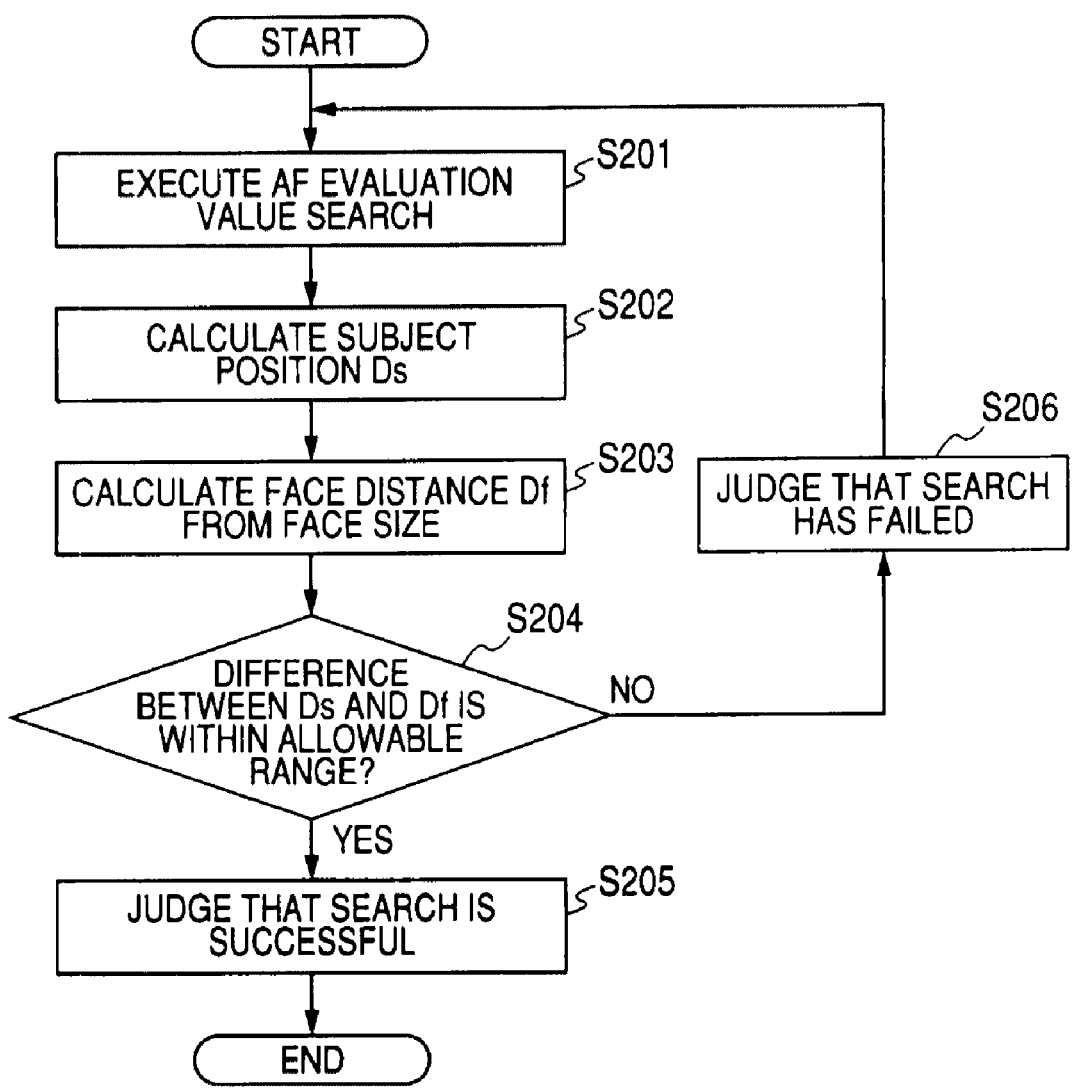
FIG. 12 is a flowchart for explaining an auto-focus control sequence of the imaging apparatus according to the embodiment.

The processing indicated by the flowchart shown in FIG. 12 is executed under the control by the control unit 110 of the imaging apparatus shown in FIG. 3. This processing is also executed after a face area and an area of eyes of a person in an image are detected in the face detecting unit 130 on the basis of an analysis of an input image obtained through the lenses and an image area including the area of the eyes is set as a specific area (a range finding area) for calculation of an AF evaluation value.

First, in step S201, the control unit 110 executes processing for searching for an AF evaluation value. In other words, the control unit 110 sequentially moves the focus lens from the close range side to the infinite side and acquires an evaluation value corresponding to contrast of a specific area (a range finding area). In step S202, the control unit 110 calculates a subject distance (Ds) at a point where an evaluation value forms a peak in this search processing. Moreover, in step S203, the control unit 110 calculates a distance (Df) to the subject on the basis of the size of the face according to the processing explained with reference to FIGS. 7 to 11.

Subsequently, in step S204, the control unit 110 compares the subject distance (Ds) calculated on the basis of the peak of the AF evaluation value and the subject distanced (Df) calculated on the basis of the size of the face and judges whether a difference between the subject distance (Ds) and the subject distance (Df) is within a threshold set in advance. When it is judged that the difference is within the threshold set in advance, in step S205, the control unit 110 judges that the evaluation value search is accurately executed and sets the peak position obtained on the basis of the evaluation value search as a focus position.

On the other hand, when the control unit 110 compares the subject distance (Ds) calculated on the basis of the peak of the AF evaluation value and the subject distance (Df) calculated on the basis of the size of the face and it is judged that a difference between the subject distance (Ds) and the subject distance (Df) is larger than the threshold set in advance in step S204, in step S206, the control unit 110 judges that the evaluation value search is not accurately executed, returns to step S201, and performs the evaluation value search again.

According to this processing, even when the control unit 110 fails in blink detection in the evaluation value search and a focus point based on an accurate evaluation value is not obtained, it is possible to detect occurrence of an error on the basis of a subject distance based on the size of the face and it is possible to prevent wrong setting of a position of the focus lens.

(4) Processing Based on a Majority Method

As in (3) above, an example of processing for judging an accurate peak position and setting the focus lens at a correct focus position according to a decision by majority of results of searches performed plural times will be explained as a measure at the time when blink detection is not accurately executed during execution of the search.

For example, when a white balance deviates or when an exposure is not correct, it may be impossible to correctly perform "blink detection" according to the processing for detecting a blink, i.e., detecting a change in a white area of an area including eyes. A method for preventing the problem is this majority method.

Specifically, the imaging apparatus executes the following processing.

When it is difficult to secure accuracy of blink detection, the imaging apparatus repeatedly executes a search in the same AF range twice.

When results of the searches repeatedly executed twice indicate the same focus position, the imaging apparatus trusts the results.

When results of the searches repeatedly executed twice are different, the imaging apparatus carries out a third search in the same range. When a position in a result of the third search is present in the results of the first or the second search, the position in the result of the third search is set as a focus position.

When all focus positions in the results of the searches repeatedly executed three times do not coincide with one another, the imaging apparatus judges that it is difficult to focus on the subject and outputs a warning or further repeats the search until a result overlapping the search results in the past is obtained.

Examples of the first to the third searches for an AF evaluation value will be explained with reference to FIG. 13. In all of the examples, an identical range finding area of an identical subject, i.e., an image area including eyes is set as a range finding area and AF evaluation values depending on contrast data are acquired. Positions of peaks are positions where contrast is the highest and the AF evaluation values are the highest and are points estimated as focus points.

However, since a position of a peak P1 in the first search and a position of a peak P2 in the second search are different, it is assumed that a measurement error has occurred in any one of the searches. In such a case, the third search is executed and comparison of a peak P3 obtained by the third search, the peak P1 of the first search, and the peak P2 of the second search is executed. The peak P3 substantially coincides with the peak P2. In such a case, the imaging apparatus judges that the peaks P2 and P3 are peaks obtained as a result of a correct search and sets a position of the peaks as a focus position.

Figure 14:
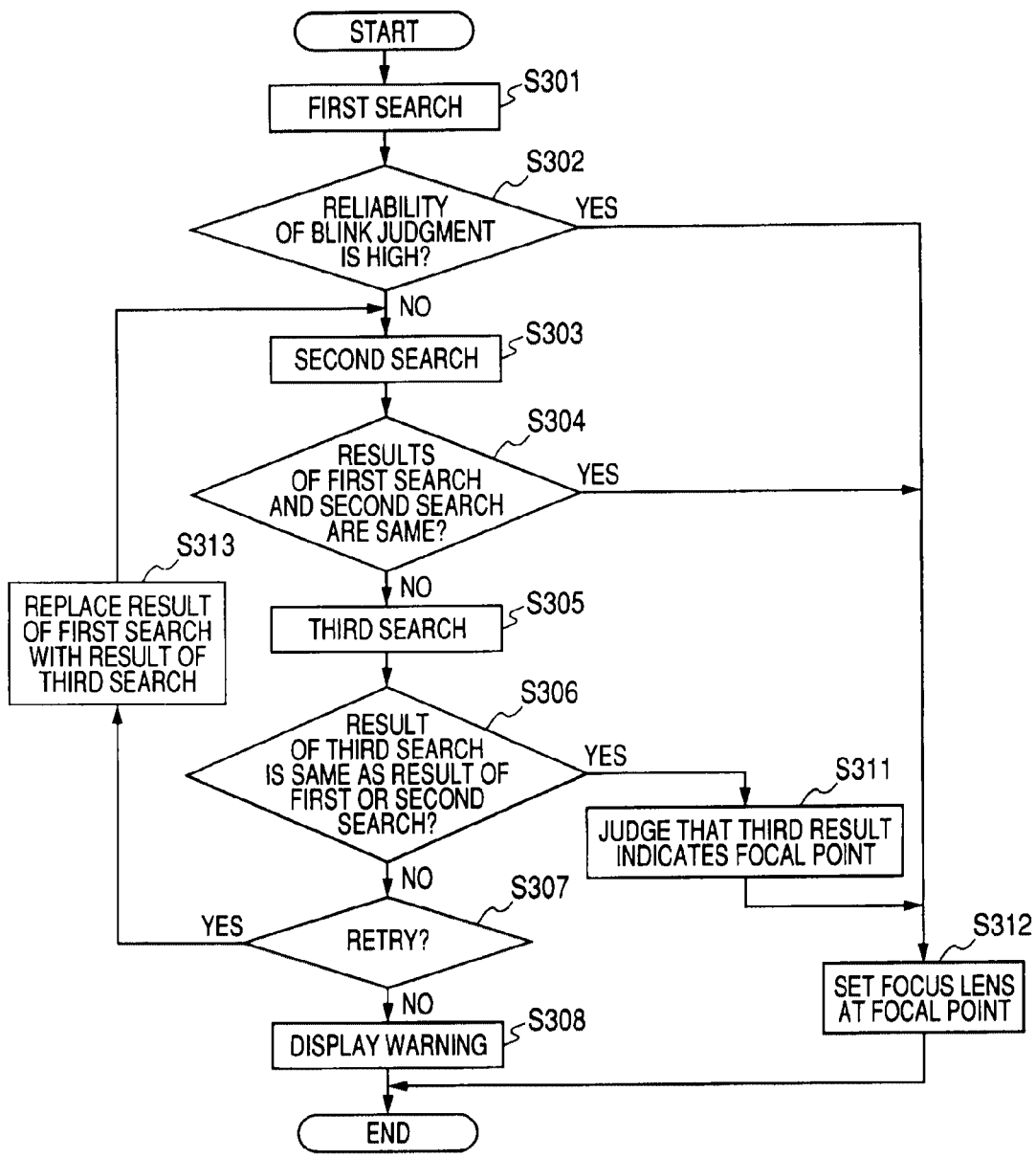
FIG. 14 is a flowchart for explaining an auto-focus control sequence to which the majority processing is applied.

In this way, in this example of the processing, the imaging apparatus determines a focus point according to the decision by majority based on the results of the searches performed plural times and determines a position for setting the focus lens. A sequence for executing this processing will be explained with reference to a flowchart shown in FIG. 14. The processing indicated by the flowchart shown in FIG. 14 is executed under the control by the control unit 110 of the imaging apparatus shown in FIG. 3. This processing is also executed after a face area and an area of eyes of a person in an image are detected in the face detecting unit 130 on the basis of an analysis of an input image obtained through the lenses and an image area including the area of the eyes is set as a specific area (a range finding area) for calculation of an AF evaluation value.

First, in step S301, the control unit 110 executes processing for searching for an AF evaluation value. In other words, the control unit 110 sequentially moves the focus lens from the close range side to the infinite side and acquires an evaluation value corresponding to contrast of a specific area (a range finding area). Subsequently, in step S302, the control unit 110 judges reliability of blink detection executed in the first search processing. As described above, when a white balance of an image acquired in the imaging apparatus deviates or when an exposure is not correct, it is assumed that the reliability of the blink detection has fallen. Therefore, the control unit 110 of the imaging apparatus judges the white balance of the acquired image and accuracy of adjustment of the exposure and judges reliability of the blink detection on the basis of information on this judgment.

When it is judged in step S302 that the reliability of the blink detection is high, the control unit 110 proceeds to step S312, judges that a peak position in an AF evaluation value in the first search processing is a focus position, set the focus lens in the focus position, and finishes the processing.

When it is judged in step S302 that the reliability of the blink detection is low, the control unit 110 proceeds to step S303 and executes a second search. The control unit 110 sequentially moves the focus lens from the close range side to the infinite side and acquires an evaluation value corresponding to contrast of the specific area (the range finding area) again.

Subsequently, in step S304, the control unit 110 executes comparison of the AF evaluation value obtained by the first search and an AF evaluation value obtained by the second search. When both the AF evaluation values are substantially identical results, the control unit 110 judges that both the searches are correctly executed and proceeds to step S312. The control unit 110 judges that a peak position in the AF evaluation values in the first or the second search is a focus position by applying the AF evaluation values to the judgment, sets the focus lens in the focus position, and finishes the processing.

When it is judged in step S304 that the AF evaluation value obtained by the first search and the AF evaluation value obtained by the second search are different, the control unit 110 proceeds to step S305 and executes a third search. The control unit 110 sequentially moves the focus lens from the close range side to the infinite side and acquires an evaluation value corresponding to contrast of the specific area (the range finding area) again.

Subsequently, in step S306, the control unit 110 executes comparison of an AF evaluation value obtained by the third search and the AF evaluation values obtained by the first and the second searches. When the AF evaluation value obtained by the third search and the search result of the first or the second search are the same, the control unit 110 proceeds to step S311. The control unit 110 judges that the AF evaluation value obtained by the third search is a correct evaluation value and proceeds to step S312. The control unit 110 judges that a peak position in the AF evaluation value of the third search is a focus position by applying the AF evaluation value to the judgment, sets the focus position in the focus position, and finishes the processing.

When it is judged in step S306 that the AF evaluation value obtained by the third search is different from both the AF evaluation values obtained by the first and the second searches, the control unit 110 judges in step S307 whether the search should be retried. When the search should not be retried, the control unit 110 proceeds to step S308, outputs a warning or a message indicating that the control unit 110 has failed in focus processing and finishes the processing. When it is judged in step S307 that the search should be retried, the control unit 110 proceeds to step S313, replaces the third search with the first search, and repeatedly executes the processing in step S303 and the subsequent steps, i.e., the second search processing and the subsequent processing. In the processing in step S307 for judging whether the search should be retried, the control unit 110 may apply information set in the apparatus in advance to the processing or may cause the user to judge whether the search should be retried and execute the search on the basis of an input of the user.

In this way, in this example of the processing, the imaging apparatus judges reliability of a peak position of an evaluation value according to a decision by majority based on results of searches performed plural times and determines a final focus point, i.e., a setting position of the focus lens. Thus, even when a correct AF evaluation value is not obtained because of an error of blink detection, it is possible to prevent the focus lens from being set in a wrong focus position.

When a position of the focus lens is determined and the imaging apparatus succeeds in the focusing according to the processing described above, the imaging apparatus presents a focus frame indicating that the focusing is successful in a display image on a monitor of the imaging apparatus and notifies the user of the success in the focusing. For example, the imaging apparatus performs focus display on a specific face. The focus display is identification information indicating completion of the focusing presented in an image displayed on the monitor or the viewfinder. The user is capable of surely photographing a subject by checking this focus display and pressing a shutter to photograph the subject.

Figure 15:
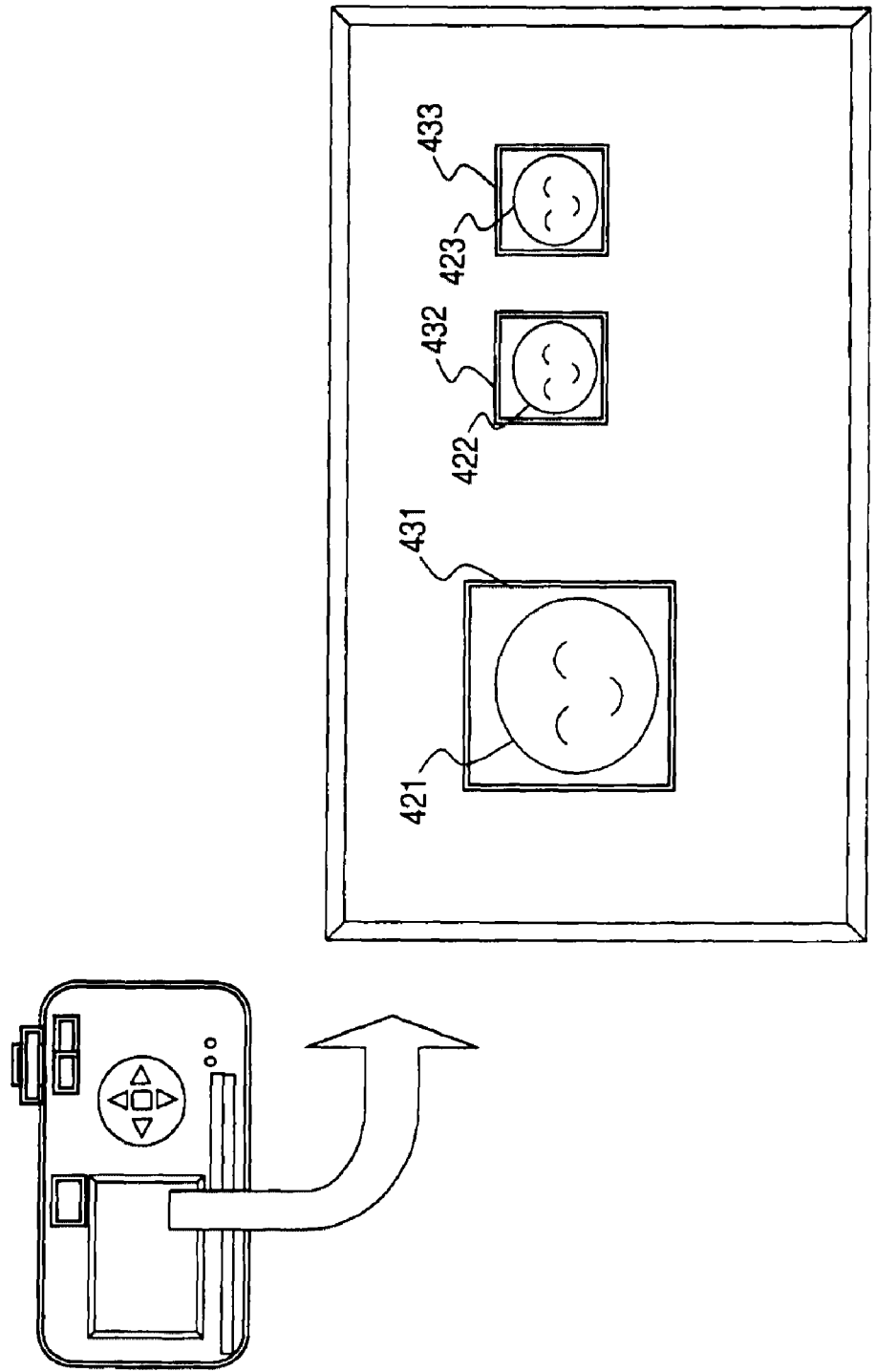
FIG. 15 is a diagram for explaining an example of focus display.

An example of the focus display is shown in FIG. 15. The example shown in FIG. 15 is an example in which the focus display is performed in an image displayed on a monitor of a camera as the imaging apparatus. For example, when the imaging apparatus executes the auto-focus processing according to the AF evaluation value calculation on the basis of an area including eyes of a face 421 shown in FIG. 15 and succeeds in focusing, a focus frame 431 is set and displayed on the face 421. Moreover, when it is judged that a face 422 and a face 423 are also in an allowable focus depth set in advance at this focus point, the imaging apparatus displays focus frames 432 and 433 on the faces. The user is capable of surely photographing a subject by checking this focus display, pressing a shutter, and photographing the subject.

Figure 16:
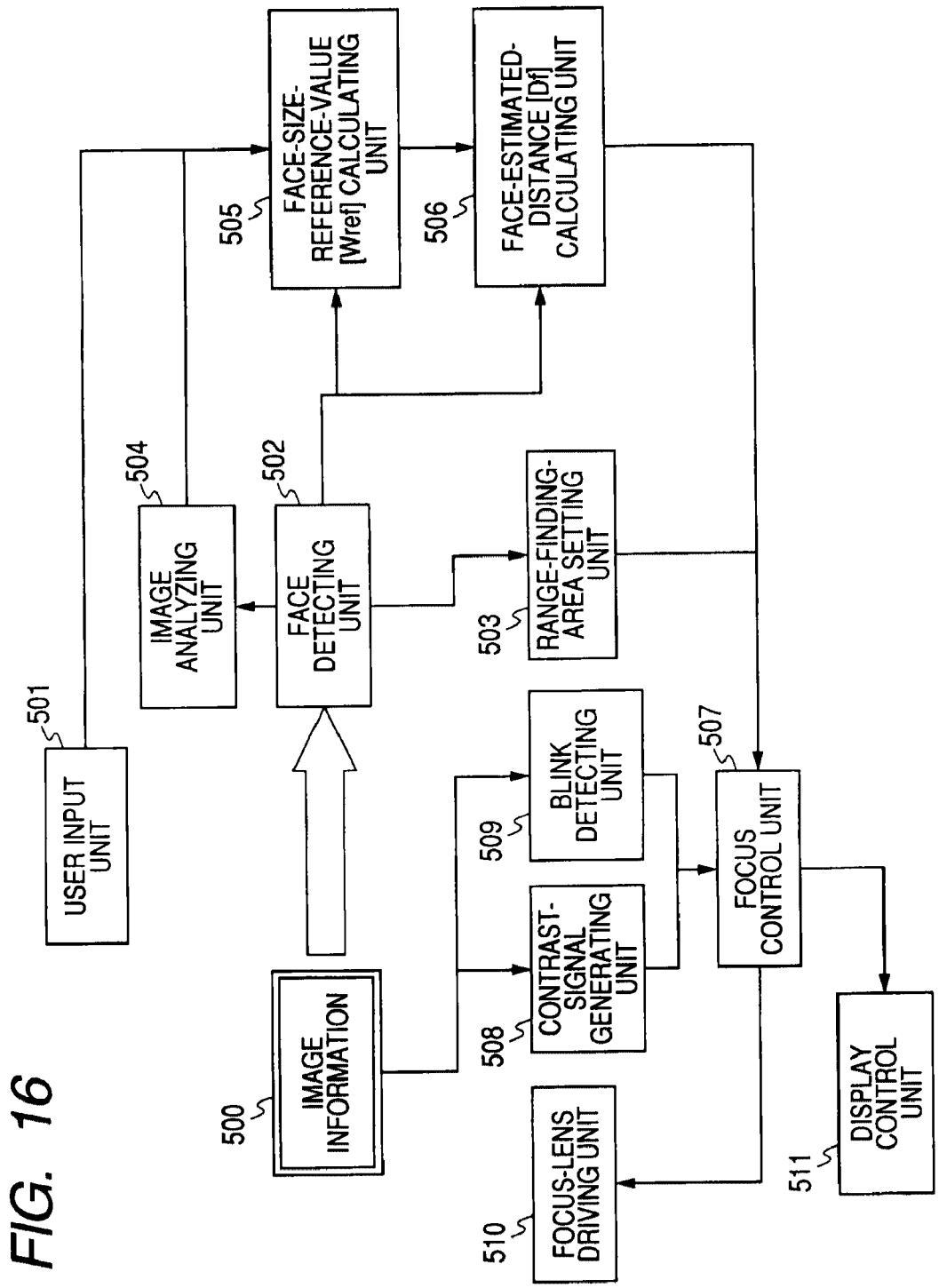
FIG. 16 is a block diagram for explaining processing and functions in the imaging apparatus according to the embodiment.

Lastly, a functional structure for performing the processing executed in the imaging apparatus according to this embodiment will be explained with reference to FIG. 16. The processing is executed by applying the hardware configuration explained with reference to FIG. 3 to the processing and in accordance with mainly a program executed under the control by the control unit 110. FIG. 16 is a block diagram for chiefly explaining functions applied to this processing in executing the processing.

Image information 500 acquired in the imaging apparatus is inputted to a face detecting unit 502 via the imaging device, the digital-signal processing unit, and the like explained with reference to FIG. 3. The face detecting unit 502 analyzes the image information 500 and detects a face and an area of an eye of a person in an image in the same manner as described above.

Image information including face detection information detected by the face detecting unit 502 is outputted to a range-finding-area setting unit 503, an image analyzing unit 504, a face-size-reference-value [Wref] calculating unit 505, and a face-estimated-distance [Df] calculating unit 506. The range-finding-area setting unit 503 sets an area including the eyes of the face detected by the face detecting unit 502 as a specific area for calculation of an AF evaluation, i.e., a range finding area.

Range finding area information including the eyes of the person set by the range-finding-area setting unit 503 is inputted to a focus control unit 507. The focus control unit 507 outputs a driving command to a focus-lens driving unit 510. The focus lens is moved in an operation range of the focus lens. The focus control unit 507 acquires an AF evaluation value from contrast information generated by a contrast-signal generating unit 508 at each moving point. In other words, the focus control unit 507 sets the image area including the eyes included in the input image 500 inputted in the imaging apparatus as a range finding area for calculation of a subject distance, acquires an evaluation value based on contrast of the range finding area, and detects a focus position.

In this AF evaluation value acquisition processing, the focus control unit 507 inputs blink detection information detected by a blink detecting unit 509 and changes processing according to whether a blink is detected. In other words, the focus control unit 507 inputs blink detection information in the blink detecting unit 509, identifies evaluation value data in a blink period and a non-blink period, and executes processing for detecting a focus position on the basis of only an evaluation value in a period judged as non-blink period. Specifically, the focus control unit 507 executes the processing explained with reference to the flowchart in FIG. 6. A display control unit 511 performs processing to display the focus frame explained with reference to FIG. 15 on a subject focused by this focus control.

For example, before the start of driving of the focus lens for acquisition of an evaluation value, when detection information indicating that a person is blinking is inputted from the blink detecting unit 509, the focus control unit 507 stands by for finish of the blink and, after it is confirmed that the blink is finished, starts driving of the focus lens for acquisition of an evaluation value. After the start of driving of the focus lens for acquisition of an evaluation value, when blink detection information indicating that the person has blinked in inputted from the blink detecting unit 509, the focus control unit 507 stops the driving of the focus lens to suspend the acquisition of an evaluation value, returns the focus lens to a focus lens setting position before the person blinks, and resumes the acquisition of an evaluation value.

However, when blink detection information indicating that the person has blinked is inputted from the blink detecting unit 509, the focus control unit 507 judges whether a peak of an evaluation value has already been detected. When the peak has been detected, the focus control unit 507 determines a focus position on the basis of the peak and finishes focus position detection processing.

Moreover, when the processing explained with reference to the flowchart in FIG. 12, i.e., calculation of a distance based on a size of a face is also executed, the image analyzing unit 504 executes the image analysis processing explained with reference to FIG. 7. In other words, the image analyzing unit 504 estimates, according to an analysis of a face image included in an image photographed by the imaging apparatus, a race, a sex, an age, and a physique of a person having the face. The image analyzing unit 504 identifies parts of the face, executes matching of the parts with parts information corresponding to races, sexes, ages, and physiques registered in advance, estimates a race, a sex, an age, and a physique of a subject, and inputs information on the estimation to the face-size-reference-value [Wref] calculating unit 505. These kinds of subject information may be inputted by the user via the user input unit 501.

The face-size-reference-value [Wref] calculating unit 504 calculates, on the basis of the subject information inputted via the image analyzing unit 503 or the user input unit 501, an optimum reference value (Wref) corresponding to the subject by applying the respective tables to the calculation. In calculation processing, as explained with reference to FIGS. 8 to 11, a reference value Wref corresponding to the subject is calculated with reference to the tables.

The face-estimated-distance [Df] calculating unit 506 calculates a subject distance Df by applying the face size reference value (Wref) to the calculation. A basic equation for calculation of the subject distance is the equation explained above, i.e., $$Df = Wref \times (f/Wi) \times (Ww/Wf) \quad \text{(Equation 1.1)}$$

where Wref is a reference value of a size of a face of a person, Wi is the width of an imaging device, f is a focal length, Wf is the number of pixels (an imaging device detection value) of a size of the face of the person in a photographed image, and Ww is the number of pixels (an imaging device detection value) of a size of an image used for detection of the face of the person.

Subject distance information calculated on the basis of the size of the face is outputted to the focus control unit 507. The focus control unit 507 compares the subject distance (Ds) calculated on the basis of the peak of the AF evaluation value and the subject distance (Df) calculated on the basis of the size of the face. When it is judged that a difference between the subject distance (Ds) and the subject distance (Df) is larger than a threshold set in advance, the focus control unit 507 judges that evaluation value search is not accurately executed and performs the evaluation value search again. This processing is equivalent to the processing explained with reference to the flowchart in FIG. 12.

Figure 13:
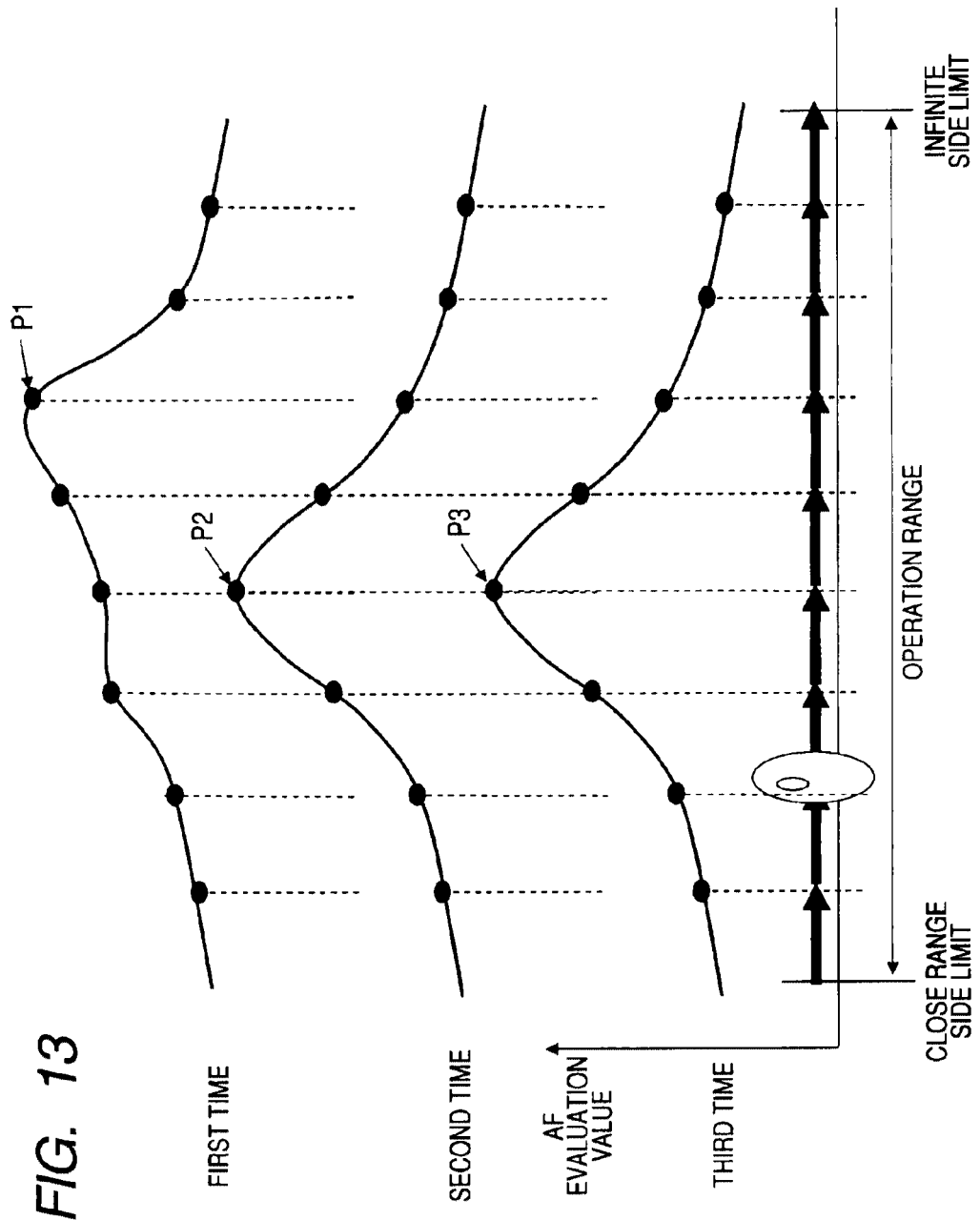
FIG. 13 is a diagram for explaining processing to which majority processing is applied.

When the majority processing explained with reference to FIGS. 13 and 14 is executed, the focus control unit 507 executes a search to which an identical range finding area is applied to repeat the AF evaluation acquisition and compares plural result data acquired. When same evaluation value data are acquired, the focus control unit 507 determines a correct peak and determines a focus position and a setting position of the focus lens according to the majority processing for setting the evaluation value data as proper evaluation data.

The invention has been explained in detail with reference to the specific embodiment. However, it is obvious that those skilled in the art can perform correction and substitution of the embodiment without departing from the spirit of the invention. The invention has been disclosed in a form of illustration and should not be interpreted limitedly. To judge the gist of the invention, the appended claims should be taken into account.

It is possible to execute the series of processing explained in this specification with hardware, software, or a combination of the hardware and the software. When the processing by the software is executed, it is possible to install a program having a processing sequence recorded therein in a memory in a computer built in dedicated hardware and execute the program. Alternatively, it is possible to install the program in a general-purpose computer capable of executing various kinds of processing and execute the program.

For example, it is possible to record the program in a hard disk or a ROM (Read Only Memory) as a recording medium in advance. Alternatively, it is possible to temporarily or permanently store (record) the program in a removable recording medium such as a flexible disk, a CD-ROM (Compact Disc Read Only Memory), an MO (Magneto Optical) disk, a DVD (Digital Versatile Disk), a magnetic disk, or a semiconductor memory. It is possible to provide such a removable recording medium as so-called package software.

Other than installing the program in a computer from the removable recording medium, it is possible to transfer the program to the computer by radio or transfer the program to the computer via a network such as a LAN (Local Area Network) or the Internet by wire from a download site. The computer can receive the program transferred in that way and install the program in a recording medium such as a hard disk built therein.

The various kinds of processing described in this specification are not only executed in time series in accordance with the above description but may be executed in parallel or individually according to a processing ability of an apparatus that executes the processing or when necessary. In this specification, the system is a logical set of plural apparatuses and is not limited to apparatuses of various structures housed in an identical housing.

As explained above, according to the embodiment of the invention, in the focus control processing for setting an image area including eyes, which is included in an input image in the imaging apparatus, as a range finding area for calculation of a subject distance and acquiring an evaluation value based on contrast of the range finding area to detect a focus position, blink detection information is inputted, evaluation data in a blink period and a non-blink period are identified, and processing for detecting a focus position is executed on the basis of only an evaluation value in a period judged as the non-blink period. Thus, it is possible to prevent occurrence of a focus error due to a contrast change based on a blink.

According to the embodiment of the invention, even when blink detection is not performed satisfactorily, for example, comparison of subject distance information based on a size of a face and a subject distance calculated from an evaluation value is executed to discriminate whether correct evaluation value acquisition is executed and evaluation value acquisition data obtained in plural times of searches are compared to acquire correct evaluation value data according to a decision by majority. Thus, even when blink detection is not performed satisfactorily, focus control based on an accurate evaluation value is realized.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
   an imaging device to capture an input image;
   a focus processing unit to acquire an evaluation value based on contrast of the input image to detect a focus position;
   a blink detecting unit to detect presence or absence of a blink of an image subject included in the input image on the basis of image analysis of the input image; and
   a control unit to move a focus lens to a search evaluation value start position prior to acquisition of the evaluation value,
   wherein, upon determination by the blink detecting unit that the image subject is not currently blinking, the focus processing unit executes processing to acquire the evaluation value in accordance with the movement of the focus lens from the search evaluation start position to detect the focus position during a period that is set in accordance with a detection result of the blink detecting unit indicating that the image subject has not blinked after movement of the focus lens from the evaluation value start position.

2. The imaging apparatus according to claim 1, wherein upon detection by the blink detecting unit that the image subject is blinking prior to start of driving of a focus lens, the focus processing unit waits until detection by the blink detecting unit that the blink is finished to start driving of the focus lens for acquisition of the evaluation value.

3. The imaging apparatus according to claim 1, wherein upon detection by the blink detecting unit that the image subject blinked after a start of driving of a focus lens for acquisition of the evaluation value, the focus processing unit suspends acquisition of the evaluation value and returns the focus lens to a focus lens setting before detection of the blink.

4. The imaging apparatus according to claim 3, wherein the return of the focus lens to the focus lens setting before detection of the blink takes into account a time difference between blink detection processing and evaluation calculation processing.

5. The imaging apparatus according to claim 1, wherein upon determination by the blink detecting unit that the image subject blinked after a start of driving a focus lens for acquisition of the evaluation value, the focus processing unit determines whether a peak of the evaluation value has been detected, and
   upon detection of the peak, the focus processing unit determines a focus position according to the detected peak.

6. The imaging apparatus according to claim 1, wherein upon determination by the blink detecting unit that the image subject blinked after a start of driving of a focus lens for acquisition of the evaluation value, the focus processing unit determines whether a peak of an evaluation value has been detected, and
   upon failure to detect the peak, the focus processing unit, upon indication by the blink detecting unit that the blink is finished, executes acquisition of the evaluation value from a focus lens setting position before the image subject blinked.

7. The imaging apparatus according to claim 1, further comprising:
   a subject-distance calculating unit to calculate a first subject distance according to a size of a face of the image subject and a second subject distance according to an evaluation value corresponding to the contrast, wherein the focus processing unit determines a difference between the first subject distance with the second subject distance, and
   upon determination that the difference is equal to or larger than a predetermined threshold, the focus processing unit repeats execution of evaluation value acquisition processing.

8. The imaging apparatus according to claim 7, wherein the subject-distance calculating unit receives subject information of at least one of a race, a sex, an age, and a physique associated with the image subject, and the size of the face of the image subject is estimated according to the subject information.

9. The imaging apparatus according to claim 8, further comprising:
   an image analyzing unit to estimate the subject information.

10. The imaging apparatus according to claim 8, further comprising:
    a user interface to receive the subject information via user input.

11. The imaging apparatus according to claim 1, wherein the focus processing unit repeats acquisition of the evaluation value upon determination that a peak of the evaluation value has not been detected and a position of a focus lens has not reached an end point.

12. A method for processing an input image in an imaging apparatus, the method comprising:
    acquiring an evaluation value based on contrast of the input image to detect a focus position;
    detecting presence or absence of a blink of an image subject included in the input image on the basis of image analysis of the input image;
    moving a focus lens to a search evaluation value start position prior to acquisition of the evaluation value; and
    acquiring, upon determination that the image subject is not currently blinking, the evaluation value in accordance with movement of the focus lens from the evaluation value start position to detect the focus position during a period that is set in accordance with a detection result of the blink detecting unit indicating that the image subject has not blinked after movement of the focus lens from the evaluation value start position.

13. A non-transitory computer readable storage medium having instructions stored thereon, which when executed by a processor in an imaging apparatus causes the processor to:
    acquire an evaluation value based on contrast of an input image to detect a focus position;
    detect presence or absence of a blink of an image subject included in the input image on the basis of image analysis of the input image;
    move a focus lens to a search evaluation value start position prior to acquisition of the evaluation value; and
    acquire, upon determination that the image subject is not currently blinking, the evaluation value in accordance with movement of the focus lens from the evaluation value start position to detect the focus position during a period that is set in accordance with a detection result of the blink detecting unit indicating that the image subject has not blinked after movement of the focus lens from the evaluation value start position.

* * * * *